United States Patent
Olieslagers et al.

(10) Patent No.: US 12,496,773 B2
(45) Date of Patent: Dec. 16, 2025

(54) METHOD AND SYSTEM FOR LAYERWISE FORMING AN OBJECT FROM A MEDIUM CAPABLE OF SOLIDIFICATION

(71) Applicant: Nederlandse Organisatie voor toegepast-natuurwetenschappelijk onderzoek TNO, 's-Gravenhage (NL)

(72) Inventors: Ruud Olieslagers, Geldrop (NL); Jeroen Anthonius Smeltink, Mierlo (NL); Jeroen Arjan Van Herp, Vlijmen (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 0 days.

(21) Appl. No.: 17/050,282

(22) PCT Filed: May 2, 2019

(86) PCT No.: PCT/NL2019/050258
§ 371 (c)(1),
(2) Date: Oct. 23, 2020

(87) PCT Pub. No.: WO2019/212346
PCT Pub. Date: Nov. 7, 2019

(65) Prior Publication Data
US 2021/0078245 A1 Mar. 18, 2021

(30) Foreign Application Priority Data
May 2, 2018 (EP) ..................................... 18170372

(51) Int. Cl.
*B29C 64/124* (2017.01)
*B29C 64/209* (2017.01)
(Continued)

(52) U.S. Cl.
CPC .......... *B29C 64/124* (2017.08); *B29C 64/209* (2017.08); *B33Y 10/00* (2014.12); *B33Y 30/00* (2014.12)

(58) Field of Classification Search
CPC ..... B29C 64/124; B29C 64/209; B33Y 10/00; B33Y 30/00; B41J 2202/21; B41J 2/02
See application file for complete search history.

(56) References Cited

U.S. PATENT DOCUMENTS

| | | | |
|---|---|---|---|
| 5,238,497 A | 8/1993 | Segawa | |
| 5,902,537 A | 5/1999 | Almquist et al. | |

(Continued)

FOREIGN PATENT DOCUMENTS

| | | |
|---|---|---|
| CN | 101952109 A | 1/2011 |
| CN | 105365221 A | 3/2016 |

(Continued)

OTHER PUBLICATIONS

European Patent Office, International Search Report in corresponding International Application No. PCT/NL2019/050258, dated Sep. 27, 2019 (3 pages).

(Continued)

*Primary Examiner* — Susan D Leong
*Assistant Examiner* — Xinwen Ye
(74) *Attorney, Agent, or Firm* — Leydig, Voit & Mayer, Ltd.

(57) ABSTRACT

An additive manufacturing method and system for layerwise forming an object from a medium capable of solidification, wherein successive layers of the medium are applied using a nozzle head including a plurality of discrete nozzles being spaced apart from each other, each nozzle having an opening area through which a continuous stream of the medium is dischargeable for impinging a coverage area on a layer of the medium on a support and/or an already formed part of the (Continued)

object. The continuous streams are non-intersecting. The nozzle head and the support are relatively movable with respect to each other in at least one running direction.

15 Claims, 20 Drawing Sheets

(51) Int. Cl.
*B33Y 10/00* (2015.01)
*B33Y 30/00* (2015.01)

(56) References Cited

U.S. PATENT DOCUMENTS

| | | | |
|---|---|---|---|
| 2012/0195994 A1* | 8/2012 | El-Siblani | B33Y 10/00 15/320 |
| 2012/0321795 A1* | 12/2012 | Gullentops | B29C 59/16 427/256 |
| 2017/0001377 A1 | 1/2017 | Meisner et al. | |
| 2017/0107383 A1* | 4/2017 | Okamoto | B29C 64/393 |
| 2017/0182798 A1* | 6/2017 | Sugai | B41J 2/175 |
| 2017/0313048 A1 | 11/2017 | Hakkaku et al. | |
| 2018/0297272 A1* | 10/2018 | Preston | B29C 64/386 |

FOREIGN PATENT DOCUMENTS

| | | |
|---|---|---|
| CN | 105856562 A | 8/2016 |
| CN | 106945278 A | 7/2017 |
| CN | 114474712 A | 5/2022 |
| EP | 1925429 A1 | 5/2008 |
| EP | 3002107 A1 | 4/2016 |
| EP | 3156231 A1 | 4/2017 |
| EP | 3181333 A2 | 6/2017 |
| WO | WO 96/23647 A2 | 8/1996 |
| WO | WO-2009013751 A2 * | 1/2009 ........... B29C 64/106 |
| WO | WO 2012/166525 A1 | 12/2012 |

OTHER PUBLICATIONS

National Intellectual Property Administration, PRC, First Office Action and Search Report in corresponding Chinese Patent Application No. 2019800347431, dated Mar. 17, 2022 (21 pages).

Japanese Patent Office, Office Action in corresponding Japanese Patent Application No. 2020-560815 dated Feb. 13, 2023.

* cited by examiner (a)

(b)

Equivalent electrical circuit setup flow chart

METHOD AND SYSTEM FOR LAYERWISE FORMING AN OBJECT FROM A MEDIUM CAPABLE OF SOLIDIFICATION

CROSS-REFERENCE TO RELATED APPLICATIONS

This patent application is a U.S. National Phase of PCT International Application No. PCT/NL2019/050258, filed May 2, 2019, which claims priority to European Application No. 18170372.9 filed May 2, 2018, which are both expressly incorporated by reference in their entireties, including any references contained therein.

FIELD OF THE INVENTION

The invention relates to a method and system for layerwise forming an object from a medium capable of solidification. Furthermore, the invention relates to a coater for applying a layer of medium in an additive manufacturing system.

BACKGROUND TO THE INVENTION

In the field of additive manufacturing there are a variety of ways in which to create an object. In stereolithography (SLA), complex three-dimensional solid objects can be made by repeatedly laying down thin layers of ultraviolet curable material one layer at a time through the use of (re-)coating means and subsequently selectively solidifying portions of the applied thin layers. The objects can be made quickly without (complex) tooling. A computer can be employed for generating the cross section of patterns. The SLA system can be readily linked to CAD/CAM systems.

Recoating is used in stereolithography for applying a thin layer of medium for a 3D printing application. Typically, the medium, which is used as building material for the to be formed object, is a (polymer) resin. A recoater can be arranged to deposit for example a thin layer of resin of typically 10-100 microns. By means of selective illumination of the portions, a layer of an object can be hardened.

Deposition of a thin layer of medium (e.g. resin) can be performed in various ways. For example, in vat printing a recoating geometry like an applicator, blade or knife is used to deposit the thin resin layers. Known recoater methods can result in an inaccurate or time consuming layer deposition while the geometry is in direct contact with the resin. A blade recoater can be swept across the liquid medium surface, intercepting existing bulges and trimming its thickness to a dimension closer to a desired layer thickness. As a result of the contact, a significant amount of resin may not be able to pass the recoater or may be dragged by the recoater itself. The amount of dragged resin is dependent on inter alia vat/bath height, viscosity and recoater velocity. While vat/bath height may vary during a build job as of the presence of the built object, the amount of dragged resin is typically not well known or controlled, which finally results in an inaccurate layer deposition. In this way, waves or non-uniformities may be formed over the path, so that a precise deposition is no longer possible.

Contactless deposition of resin can eliminate dragging of resin which causes the inaccurate layer deposition. Contact between the bath and the coater itself can be avoided. In a known method, an elongated wide slit is used from which a screen or curtain of medium is deposited for coating an upper layer in the vat/bath. However, it is challenging for scaling up a curtain or screen to a larger width (e.g. more than 1 meter). Furthermore, by movement of the coater, air may impinge on the screen, resulting in flow instabilities such as extreme curvatures or even breakage of the screen or curtain, resulting in additional non-uniformities of an applied (successive) layer of resin. Furthermore, hydraulic pressures required for discharging a highly viscous medium through the slit can easily reach values of 10-100 bars. A slit gap can deform as a result of high pressures, which can result in an inaccurate screen thickness. Additionally, creating a slit with a relatively small gap thickness (e.g. approximately 100 micrometer or smaller) of over a longer length (e.g. approximately 1 meter or larger), combined with a strict gap tolerance (e.g. in the order of micrometers), can be extremely costly and difficult to achieve.

There is a need for a (re)coating means which is easy to manufacture, robust and/or scalable. Furthermore, there is a need for a (re)coating means allowing an accurate deposition of a (thin) layer of resin.

SUMMARY OF THE INVENTION

It is an object of the invention to provide for a method and a system that obviates at least one of the above mentioned drawbacks.

Additionally or alternatively, it is an object of the invention to provide for a method and a system that enables an accurate, stable and/or uniform deposition of a successive layer of medium with an improved deposition stability.

Additionally or alternatively, it is an object of the invention to provide for an improved contactless (re)coating means in an additive manufacturing system or method.

Thereto, the invention provides for a method for layerwise forming an object from a medium capable of solidification, whereby the object is built up layer per layer by repeatedly providing a layer of the medium on a support (e.g. liquid filled VAT, constrained surface like for instance a glass plate or foil) and/or an already formed part of the object and by subsequently solidifying one or more predetermined areas of the layer of the medium according to a specific pattern before a successive layer is formed in a same manner. The successive layers of the medium are applied using a nozzle head including a plurality of nozzles being spaced apart from each other, each nozzle having an opening area through which, during application of the successive layer, a continuous stream of the medium is discharged for impinging a coverage area on the layer of the medium on the support and/or the already formed part of the object. The plurality of nozzles are arranged to provide non-intersecting continuous streams. The nozzle head and the support are relatively movable with respect to each other in at least one running direction. In the at least one running direction the coverage areas of the continuous streams cover an entire coverage width in one or more runs of the nozzle head.

A complete/continuous coverage can be obtained by means of the plurality of nozzles, in one or more runs of the nozzle head in the at least one running direction (e.g. back and forth scanning along the surface on which the medium is applied). Since the coverage areas of the continuous streams cover an entire coverage width, seen in the at least one running direction, a substantially uniform distribution of the successive layer of the medium can be obtained.

Optionally, the coverage areas of the continuous streams cover an entire coverage width in a single run. A single run (cf. pass) in the at least one running direction may thus provide a complete coverage of a successive layer of medium.

A multiple nozzle (re-)coater can be obtained configured to deposit the medium (e.g. resin) by injecting the medium through a set of different nozzles. The paths of the coverage areas of the continuous streams discharged from the plurality of nozzles in the at least one running direction may be such that a complete/entire covering is obtained. Hence, the plurality of paths of the coverage areas in the at least one running direction can be free of non-covered regions therebetween, such that a substantially uniform coverage area can be obtained with a single stroke or run in the at least one running direction. Seen in the at least one running direction, the entire coverage width may encompass each of the plurality of coverage areas, while a substantially continuous coverage over the coverage width is obtained. The nozzle configuration on the nozzle head is arranged in such a way that intersection between the continuous streams being discharged from the plurality of nozzles is prevented. This can be achieved by i.a. appropriate arrangement of a spray height, a spray angle and/or a spray orientation with respect to the surface on which the medium is applied. The surface on which the successive layer is to be applied can be an upper medium layer (liquid or hardened) in a container or on a support. Advantageously, the coverage areas are chosen such as to continuously occupy the complete coverage width, as seen in the at least one running direction. As a result of relative movement of the nozzle head, in said at least one running direction, a substantially uniform layer of the medium can be applied. The nozzle head allows uniform application of a layer of medium in a scalable and controllable way. Moreover, the nozzle head is relatively easy to manufacture and robust. High pressures can be employed for discharging the medium from the plurality of nozzles. By means of the nozzle head with the plurality of nozzles, a wide substantially continuous printing area can be accurately coated by relative movement in the at least one running direction.

The continuous non-intersecting streams discharged from the plurality of nozzles allow air to move therebetween when for example the nozzle head is moved with respect to the surface on which the successive layer is to be applied. This is contrary to the case where an elongated curtain or screen of medium is applied through an elongated slit, where a higher pressure can build up surrounding the curtain/screen.

In addition to improved scalability, robustness and manufacturability, a multiple nozzle coater may also provide the ability to spatially control and/or adjust a thickness of an applied layer of the medium.

By solidifying or hardening a liquid medium layer by layer in predetermined patterns, an object or a part can be formed. The medium may be a build material for additive manufacturing or stereolithography. VAT materials can be employed, such as polymer and/or ceramic materials. In VAT polymerization ultraviolet (UV) light hardens a liquid in a 3D printing process. For instance, a liquid of ultraviolet curable photopolymer resin and an ultraviolet laser can be used to build layers of the object one at a time. For each layer, the laser beam can trace a cross-section of the object pattern on the surface of the liquid resin. The pattern traced on the resin can be cured, solidified and joined to a layer below by exposure to the ultraviolet laser light.

The continuous streams discharged through the opening areas of the nozzles can form a stable unbroken jet. The plurality of nozzles are arranged such that, in use, the continuous streams/jets do not make contact with each other while applying the successive layer of the medium. In this way, a more uniform application of the medium can be obtained. The successive layer of medium can form a thin film. Contact or intersection between the liquid jets can cause splattering and/or turbulence. Nevertheless, as a result of the relative movement in the at least one running direction, a complete covering in the entire coverage width can be obtained. The plurality of nozzles can be configured to provide a non-contiguous screen of medium provided by discrete continuous streams. The plurality of nozzles and thus the discrete continuous stream are swept across an upper medium surface in the at least one running direction.

Optionally, paths of the coverage areas of the continuous streams discharged from the plurality of nozzles in the at least one running direction at least partially overlap.

Advantageously, the continuous streams are separate with respect to each other and contact between the continuous streams is avoided. A continuous stream can emerge from each nozzle of the plurality of the nozzles of the nozzle head, each continuous stream depositing a path (line) of a coverage area on a support, a layer of the medium on the support and/or an already formed part of the object. By at least partially overlapping different paths of the continuous streams in the at least one running direction, a continuous layer of the medium can be applied. However, this continuous layer may still have a certain level of non-uniformity as the medium is not completely uniformly distributed on the surface on which it is applied. A more uniform distribution of the medium can be obtained by waiting for a predetermined time in order to allow gravity to spread the medium out on the surface.

The amount of overlap of adjacent paths of the coverage areas in the moving direction can be optimized in order to enhance the uniformity and the layer thickness of the applied layer of medium. In the middle of the coverage area more material may be deposited than compared to outside regions of the coverage area.

The plurality of nozzles may be configured to provide coverage areas being arranged in at least one linear array including a plurality of coverage areas arranged straight next to each other, the plurality of coverage areas fully covering a coverage width. For this continuous coverage along the entire coverage width, the paths of the plurality of coverage areas formed in the at least one running direction may be (directly) adjacent each other or at least partially overlap. One array or row of coverage areas can be offset from another array or row of coverage areas. In an example, the plurality of coverage areas are interdigitated with respect to each other.

Optionally, the neighboring coverage areas of a same coverage area array are distanced at a coverage area pitch being measured from a center point of the coverage area to a center point of the neighboring coverage area in the same array or row. The coverage area pitch is preferably between 0.5 to 1 times a coverage area diameter times a total number of arrays of the plurality of nozzle arrays, for example preferably between 0.8 to 0.9. In an example, the coverage area pitch is between 0.85 to 0.8525. It will be appreciated that other ranges/values are also possible. Local non-overlapping coverage areas may result when a large pitch is chosen. In order to increase robustness and/or avoid local distortions, the preferred pitch can be lowered to 0.5-0.75 times the coverage area diameter. Advantageously, as a consequence of this reduced pitch robustness can be significantly reduced while a larger average thickness is obtained. It will be appreciated that other values are also possible, as these values may depend on various operation parameters and other properties of the system.

By means of the (partial) overlap an improved continuous coverage of the medium on the surface on which it is applied can be obtained. In this way, the successive applied layer is more uniformly distributed.

Optionally, an overlap between the plurality of coverage areas is obtained by means of one array or row of coverage areas at an angle with respect to the at least one running direction.

Optionally, the coverage areas of neighboring arrays are offset at an coverage area array pitch in the at least one running direction, the coverage area array pitch being measured from a first line going through center points of the coverage areas of the first array to a second line going through center points of coverage areas of the second array, wherein the coverage area array pitch is larger than two times a coverage area diameter.

An entire coverage width may for instance form a portion of the width of the nozzle head. In an example, the coverage width substantially corresponds to an entire width of the container holding the medium. Optionally, the nozzles are configured such that a plurality of different running directions can be employed for providing a uniform/even successive layer of the medium.

Optionally, the nozzle head includes a plurality of nozzle arrays which are offset from each other, the plurality of nozzle arrays being arranged in at least a first nozzle array and a second nozzle array, wherein in the at least one running direction a path of the coverage areas of the continuous streams of the nozzles of the first array at least partially overlap with respect to a path of the coverage areas of the continuous streams of the nozzles of the second array. In an example, the nozzle arrays are linear arrays including a plurality of nozzles arranged straight next to each other.

Optionally, the plurality of nozzles have a spray angle of substantially 0°. The plurality of the nozzles of the nozzle head may for example be arranged so as to discharge continuous streams which move downwards in a substantially straight line. The coverage area may be cylindrically shaped with a diameter substantially equal to the diameter of the opening area of the nozzle. This can for instance be achieved by employing nozzles with a spray angle of substantially 0 degrees. The dependence of the size of the coverage area on the height of the nozzle with respect to the surface can be reduced and/or eliminated when a spray angle of 0 degrees is employed. It will be appreciated that other spray angles may also be employed for influencing the coverage area on a surface on which the nozzles apply the layer of medium. The coverage area is also influenced by the flow rate of the medium being discharged from the opening area and/or the relative orientation of the nozzle with respect to the surface. A thickness of an applied layer of medium on a surface can depend on a diameter of the continuous stream (cf. diameter of the nozzle), a flowrate of the discharged medium, and/or a velocity in which the scan head is moved in the running direction (cf. recoating speed). The path of the coverage area of a nozzle, in the at least one running direction, may border on or at least partially overlap with one or more other paths of the coverage areas of other nozzles in the same running direction. For instance, the path of the coverage of a nozzle may border on or at least partially overlap with its neighboring adjacent nozzles seen in the at least one running direction. When nozzles with a spray angle of 0 degrees are employed the continuous streams being discharged may be line shaped (e.g. cylindrical jet). In such a case, allowing the opening areas of the nozzles to border on or at least partially overlap with neighboring or adjacent nozzles, seen in the at least one running direction, also on the surface on which the successive layer of medium is applied (e.g. substrate) a uniform distribution of the medium can be obtained when moving in the at least one running direction, since the paths of the coverage areas of the nozzles will border on or at least partially overlap with paths of the coverage areas of said neighboring or adjacent nozzles. By means of a partial overlap, an improved complete coverage along the entire coverage width can be obtained. This coverage of the medium can be more continuous and/or uniform.

Optionally, the continuous streams discharged from the plurality of nozzles are conical. Such a conical shape of the continuous streams can be obtained by selecting the spray angle. In this way, it may not be necessary to arrange the nozzles adjacent each other and/or in an overlapping manner seen in the at least running direction.

Optionally, each nozzle array has approximately an equal number of nozzles.

Nozzles in an array can be arranged along a certain direction, for example in a substantially straight line. However, other configurations are also envisaged. For example, a nozzle array can be arranged in an oblique line with respect to the at least one running direction.

Optionally, in the at least one running direction the opening areas of the nozzles of the first array at least partially overlap with respect to the opening areas of the nozzles of the second array.

Optionally, in the at least one running direction the opening areas of the plurality of nozzles cover the entire coverage width being larger or equal to an entire length of each array of the plurality of nozzle arrays.

Optionally, the plurality of nozzles provide a successive layer of medium, wherein gravity provides the final flatting of the surface of the applied successive layer of the medium. After a delay or wait time, bulges on the successive applied medium layer can flatten due to gravity and the liquid medium surface becomes more or less flat.

Optionally, nozzles in an array are distanced at a nozzle pitch being measured from a center point of an opening area of a first nozzle to a center point of an opening area of an adjacent nozzle in a same array, wherein the pitch is between 1 to 2 times a nozzle radius times a total number of arrays of the plurality of nozzle arrays, preferably between 1.6 to 1.8, even more preferably between 1.7 to 1.75.

The pitch can be optimized analytically, computationally and/or empirically. Many different types of models can be employed. The layer thickness and/or non-uniformity can be determined from the overlap of the coverage areas of the continuous streams discharged by the plurality of nozzles of the nozzle head.

By optimally using the nozzle pitch, non-uniformity can be significantly reduced. Optionally, after application of the layer of the medium a predetermined wait time is employed in order to obtain a more uniform distribution resulting from gravity.

Optionally, nozzles of neighboring arrays are offset at an array pitch in the at least one running direction, the array pitch being measured from a first line going through center points of opening areas of the nozzle of the first array to a second line going through center points of opening areas of nozzles of the second array, wherein the array pitch is between 2 to 15 times a nozzle radius.

Optionally, the plurality of nozzles are discrete nozzles.

Optionally, nozzles are arranged to selectively dispense a continuous stream of the medium, the nozzles having an adjustable flow rate for discharging the medium. The flow rate discharged from the nozzle may be controllable. In an example, each of the plurality of nozzles comprises an adjustable restriction. Optionally, the opening areas of at least a subset of the plurality of the nozzles is adjustable. The supply of medium can be controlled spatially, which can significantly enhance the controllability of applying the successive layer.

The nozzle head may contain a positively pressurized liquid medium in flow communication with the plurality of the nozzles for emitting the plurality of continuous streams of liquid medium having a nominal stream/flow velocity.

Optionally, at least two subsets of the plurality of nozzles are configured to provide different materials, wherein a first subset is in fluid communication with a first reservoir containing a first material and the second subset is in fluid communication with a second reservoir containing a second material. This may enable simultaneously printing multiple types of resins (i.e. multi-material additive manufacturing). The first reservoir may for instance be separate with respect to the second reservoir.

Optionally, prior to applying the successive layer of the medium, a height distribution of an upper surface of the layer of the medium on the support and/or the already formed part of the object is determined by means of a measuring device, wherein applying the successive layer is carried out based on the determined height distribution so as to compensate for unflatness and/or non-uniformity of the measured height distribution.

The method enables an accurate medium layer deposition over a large area, with the possibility to adjust layer thickness spatially (by implementation in a control loop). Optionally, compensating is realized by calculating, based on the determined height distribution, a distribution of the medium to be applied on the layer of the medium on the support and/or the already formed part of the object.

If the medium (e.g. resin) is hardened or solidified, it may shrink to some extent. In order to create an even/uniform layer, the shrinkage may be compensated for when applying the successive layer. In this way, at locations where the medium is hardened, more medium may be deposited, which is made possible by means of the plurality of the individual nozzles of the nozzle head. The amount of medium deposited by the nozzles can be better controlled. Such a spatial controllability of the deposition is very advantageous in additive manufacturing or stereolithography.

Low flow rates of medium being discharged from the plurality of nozzles is desired for applying a thin layer of medium. However, at low flowrates, wetting may occur. The medium can wet a surrounding surface near the opening area of the nozzle (i.e. nozzle exit).

Optionally, each nozzle is provided with an edge wall extending around its opening area. Wetting is detrimental but can be eliminated or postponed by using a nozzle edge wall and/or temporarily start up with a higher flow rate as desired.

Additionally or alternatively, the plurality of nozzles may be surrounded by a hydrophobic coating such that it is prevented that the medium can adhere to it. Hence, wetting/dripping can be prevented in this way.

Additionally or alternatively, the flow being discharged from the opening areas of the plurality of nozzles of the nozzle head is controlled in order to substantially prevent or reduce the risk of wetting. The problem of wetting mainly occurs during a start-up phase for discharging the medium through the plurality of nozzles. Initially, a higher flow rate can be employed and subsequently the flow rate can be reduced back to the flow rate needed for the additive manufacturing process. Since a higher flow rate being discharged by the nozzle will result in a thicker layer of medium, this can be performed next to the area of interest on the surface on which the successive layer of the medium is to be applied. For example, next to a bath/vat or in a separate container.

Optionally, a nozzle angle is adjusted in order to change an angle of attack and thereby a resulting impingement force. The angle of the continuous stream with respect to the impinged surface (cf. angle of attack) can have a significant influence on the impingement force. Hence, in this way, the angle may be chosen in order to reduce the impingement force. For example, impingement or drag forces on the fluidic vat or the already formed product can be reduced by giving the nozzle an angle directed backwards inline with running direction.

Optionally, a shield is mounted at at least one side of scan head in order to protect the continuous streams from aerodynamic forces during motion in the at least running direction. The shield may for example be provided in front of the plurality of nozzles. In an example, a shield is provided at both sides of the nozzle head (e.g. front and back seen in the running direction).

Optionally, a (single) successive layer is provided by performing a plurality of runs (cf. passes back and forth along a to be covered surface) in the at least one running direction, wherein, in a first run, paths of the coverage areas of the continuous streams discharged from the plurality of nozzles in the at least one running direction are distanced from each other with non-covered regions therebetween, wherein the non-covered regions are subsequently covered by performing one or more additional runs, wherein prior to performing the one or more additional runs, the coverage areas are shifted in a direction transverse to the running direction such that the paths of the coverage areas during the additional run cover at least a portion of the non-covered regions.

The nozzle head may be configured to provide coverage areas which are distanced in such a way that the paths of the coverage areas in the running direction have a gap therebetween. In the gaps between the paths of the coverage areas, no medium is applied in the initial run. The gaps are covered by applying a layer of medium in successive additional runs, wherein the coverage areas are displaced in a direction traverse to the running direction. In this way, by employing a plurality of runs, for example by moving the nozzle head back and forth, layer of the medium can be applied over an entire coverage width. At least two runs are needed in order to obtain a complete covering.

During additional successive runs the coverage areas can be relatively shifted in order to cover previously non-covered regions from the first run. The one or more additional runs can be performed until the non-covered regions are fully covered, such that an uniform applied layer of the medium is obtained. A single successive layer can be applied by moving the nozzle head one or more times back and forth in the running direction. One back and forth movement may provide two runs. In an example, a plurality of back and forth movements are performed until a complete (uniform) covering is obtained. A second back and forth movement may for example provide two additional runs.

In an example, the following steps are performed for applying a successive layer of the medium:
Perform an initial run (i.e. first recoat stroke) by relatively moving the nozzle head in the running direction (e.g. x direction) in order to deposit a line pattern having a predetermined pitch.

Relatively move the nozzle head transverse to the running direction (e.g. y direction). The nozzle head can for instance be (relatively) shifted with a half pitch or more.

Perform an additional run (i.e. second recoat stroke) in order to deposit a line pattern in regions that have not previously been covered by performing the initial run. In this way, a uniform medium covering can be obtained for the successive layer.

The nozzle head can then be moved back traverse to the running direction (e.g. y direction) prior to repeatedly performing the above steps for applying the next successive layers.

Optionally, a center to center distance between two neighboring nozzles is at least 2.2 mm, more preferably at least 2.4 mm, even more preferably at least 2.5 mm.

Advantageously, touching of formed droplets at neighboring nozzles can be prevented for example when starting discharge of medium (resin) from the nozzles. The minimum center to center distance between two neighboring nozzles may depend on various factors, such as for example i.a. properties of the used medium (cf. density, surface tension, etc.), the nozzle diameter.

Optionally, a flow pulse is provided during initial commencement of discharging of the continuous stream of medium.

The pulse may be an initial peak flow (cf. pulse or peak in the flow velocity) during start up of discharging of the continuous stream of medium through the nozzles. One or more flow pulses can be included in the discharge flow of the continuous stream of medium through the nozzles. In an example, a single flow pulse is provided during initial commencement of discharging through the nozzles.

Optionally, prior to discharging the continuous stream of the medium through the nozzles, pressure is built up such as to obtain a pulse in the velocity of the flow during initial discharging.

The pressure being built up can ensure direct entry into the jetting regime to prevent the jets from interacting with each other resulting into emanation of individual jets.

A valve in the supply to the nozzle head can be closed before the pump is switched on. As a result, fluid pressure can build up. By subsequently opening the valve, a pressure pulse or flow pulse (cf. peak flow) is created, which can result in a jet formation. In this way, a continuous stream can be obtained even if the center to center distance is rather small, e.g. smaller than 2.2 mm.

Optionally, gas is guided through the nozzles at an end of a discharge. The injected gas may for instance be air.

Optionally, gas is injected through the nozzles when discharge of medium through said nozzles has stopped. Advantageously, in this way a 'wetting' process in which medium wets a surrounding area at or near the opening areas of the nozzles of the multiple nozzle head can be substantially prevented. Dripping may also be at least partially prevented.

This can be achieved in different ways. In an example, a three way valve is arranged such that pressurized gas is injected into the recoater pushing the medium out of nozzles at a high flow rate in order to substantially prevent eventual dripping and/or wetting.

Optionally, at least one of a: a speed of relative movement in the running direction, a distance of the plurality of nozzles to the support and/or the already formed part of the object, and a flow rate through a nozzle, is selected in order to maintain a vertical continuous stream of the medium discharged through the plurality of nozzles. In this way, it can be prevented that a continuous stream of medium being discharged (cf. jet) breaks down due to bending (resulting from the relative movement during recoating), making it discontinuous. Therefore, a continuous sheet of resin can be deposited even when different operating conditions (e.g. speed of movement, jet height, and flow rate) are chosen. Optionally, the above operating conditions are controlled by means of a controller unit.

The continuous streams of medium discharged through the nozzles (cf. jets) may contract when being discharged due to surface tension. As a result, the coverage areas may be smaller than the nozzle diameter.

Optionally, the paths of the coverage areas of the continuous streams in the at least one running direction, being discharged from the plurality of the nozzles overlap in a range of 0-50% of the width of the coverage area, more preferably 25-50%.

In an example, the paths of the coverage areas of the continuous streams in the at least on running direction, being discharged from the plurality of the nozzles overlap in a range of 60-140 µm, more preferably in a range of 80-120 µm. It will be appreciated that other values are also possible, since the coverage path width depends on various parameters and properties, e.g. viscosity, flowrate, scan speed, etc.

Optionally, the overlap is at least 80 µm, more preferably at least 90 µm, even more preferably at least 100 µm. By providing sufficient overlap, a more robust sheet deposition can be obtained.

As a result, a continuous successive recoating layer may be obtained even for higher speeds (e.g. >0.5 m/s) of the relative movement in the at least one running direction.

The successive recoating layer may for instance be provided in a single scan deposition. However, alternatively, the successive recoating layer is deposited by means of a plurality of runs of the nozzle head in the at least one running direction (e.g. using interlacing, stitching, etc.).

According to a further aspect, the invention relates to a method for layerwise forming an object from a medium capable of solidification, the method comprising the steps of: providing a reservoir containing the medium; solidifying a predetermined area of an upper layer of the medium in the reservoir, so as to obtain a solidified layer of the object having a predetermined shape; repeatedly performing a successive layer-forming step and a successive solidifying step to form the object, wherein the successive layer-forming step comprises applying a successive layer of medium above a preceding solidified layer, and the successive solidifying step comprises solidifying the applied successive layer of medium so as to obtain a successive solidified layer adhered to the preceding solidified layer; wherein applying the successive layer of medium in the successive layer-forming step is carried out using a nozzle head, wherein the nozzle head and the medium in the container are movable with respect to each other in at least one running direction; wherein the nozzle head includes a plurality of nozzles, the nozzles being configured to discharge a plurality of continuous non-intersecting streams of medium each forming coverage areas on the surface on which the successive layer of medium is applied, wherein in the at least one running direction the coverage areas of the continuous streams cover an entire coverage width. Optionally, the plurality of coverage areas are spaced apart from each other and arranged in a plurality of coverage area arrays or rows which are offset from each other, the plurality of coverage area arrays or rows including at least a first coverage area array and a second coverage area array, wherein paths of the coverage areas of the nozzles of the first array or row at least partially overlap paths of the coverage areas of the nozzles of the second array or row in the at least one running direction.

According to a further aspect, the invention relates to a system for layerwise forming an object from a medium capable of solidification, the system comprising: a support configured to carry the medium, coating means configured to discharge a layer of the medium, solidifying means configured to selectively solidify the medium, and a controller configured to operate the coating means and solidifying means in order to repeatedly provide, by means of the coating means, a layer of the medium on the support and/or the already formed part of the object, and subsequently solidify, by means of the solidifying means, one or more predetermined areas of the layer of the medium according to a specific pattern before a successive layer is formed in a same manner. The coating means includes a nozzle head for applying the successive layers of the medium, the nozzle head comprising a plurality of nozzles being spaced apart from each other, each nozzle having an opening area through which a continuous stream of the medium is dischargeable for impinging a coverage area on the layer of the medium on the support and/or the already formed part of the object. The plurality of nozzles are arranged to provide non-intersecting continuous streams during application of the layer of the medium. The system is configured such that the nozzle head and the support are relatively movable with respect to each other in at least one running direction. The nozzle head is configured to provide continuous streams providing coverage areas which cover an entire coverage width in the at least one running direction in one or more runs of the nozzle head.

A support may be provided in a container holding the (liquid) medium. A layer of the liquid medium in the container is then produced above the fixed support by means of the plurality of nozzles discharging the continuous streams. A preselected cross-section of the applied successive medium layer is solidified (e.g. using CAD data) by exposing at least a portion of the applied medium layer to prescribed energy in accordance with a design for the three-dimensional object. The liquid medium layer-producing performed by means of the nozzle head including the plurality of nozzles, and the solidifying step are then repeated, as necessary, to form the three-dimensional object. Each layer of the medium is applied either partially, or entirely, by dispensing the successive medium layer above the support. Advantageously, a uniform distribution is obtained by arranging the nozzles such that an entire coverage width is encompassed in the at least one running direction by the plurality of resulting coverage areas.

The plurality of nozzles can be arranged in such a way to prevent intersection between the continuous streams being discharged therefrom. The continuous streams being discharged from the nozzle head through the opening areas of the plurality of the nozzles do not make contact with each other. A complete covering over a complete coverage width can be obtained when the nozzle head is relatively moved in the at least one running direction with respect to the surface on which the successive layer of the medium is applied.

The plurality of nozzles of the nozzle head may discharge discrete continuous streams (or jets) depositing a layer of the medium along a path of the coverage area in the at least one running direction.

A relative motion apparatus can be used in order to move the nozzle head and the receiving (medium) surface, on which the successive layer of medium is to be applied, with respect to each other in the at least one running direction at a process velocity so that medium can be applied evenly and uniformly using the plurality of nozzles.

The opening areas of the plurality of nozzles of the nozzle head form exit orifices which are not in direct contact with each other. The exit orifices are spaced apart, however, the nozzles are configured such that the coverage areas formed by the plurality of continuous streams in the at least one running direction form an entire coverage width.

Optionally, the nozzle head is configured such that paths of the coverage areas of the continuous streams discharged from the plurality of nozzles in the at least one running direction at least partially overlap.

The coverage areas of the continuous streams are partially overlapping or at least adjacent to each other so that in the running direction a full coverage over the coverage width is obtained. In this way, a substantially continuous and/or uniform successive layer of the medium can be applied by means of the nozzle head.

Optionally, the plurality of nozzles of the nozzle head are arranged in a plurality of nozzle arrays which are offset from each other, the plurality of nozzle arrays including at least a first nozzle array and a second nozzle array, wherein in the at least one running direction a path of coverage areas of the continuous streams of the nozzles of the first array at least partially overlap a path of the coverage areas of the continuous streams of the nozzles of the second array.

In an example, the plurality of nozzles have a spray angle of substantially 0°. However, other spray angles are also envisaged.

Optionally, in the at least one running direction the opening areas of the nozzles of the first array at least partially overlap with respect to the opening areas of the nozzles of the second array.

Optionally, in the at least one running direction the opening areas of the plurality of nozzles cover the entire coverage width being larger or equal to an entire length of each array of the plurality of nozzle arrays.

By arranging the plurality of nozzles at a predetermined pitch, the level of overlap between the opening areas and/or the coverage areas can be determined. Advantageously, the pitch can be tuned in order to optimize the uniformity or flatness of the successive applied layer of the medium. However, this parameter is also dependent on other parameters, such as but not limited to the speed of the relative motion between the nozzle head and the surface on which the successive layer is applied in the at least on running direction (cf. recoating speed), the nozzle angle, the spray angle, the distance between the nozzle and the surface, the orientation of the nozzle, the flow rate of the medium being discharged through the opening areas of the nozzle, the diameter of the opening area, the material and/or fluid properties of the medium (e.g. viscosity), etc.

The plurality of nozzles may be divided into or grouped together in different subsets each subset providing a medium with other properties. Mediums with different material properties or features (e.g. color) can be used. The nozzles in the subsets can share a common channel through which medium is delivered.

According to a further aspect, the invention relates to a coater for applying a layer of the medium for use in an additive manufacturing system according to the invention, the coater comprising a nozzle head including a plurality of nozzles being spaced apart from each other, each nozzle having an opening area through which a continuous stream of the medium is dischargeable for impinging a coverage area on a support, a layer of the medium on the support and/or an already formed part of the object. The plurality of nozzles are arranged in such a way to prevent intersection between the continuous streams being discharged therefrom. Further, the nozzle head is relatively movable with respect to the support in at least one running direction. The nozzle head is configured to discharge, through the plurality of nozzles, continuous streams having coverage areas which cover an entire coverage width in the at least one running direction in one or more runs of the nozzle head.

The nozzle head can be employed as a resin film recoater in a stereolithographic method or system, the nozzle head being arranged to act as a dispenser for applying a uniform (successive) layer of the medium. Many variants of nozzle patterns can be employed.

An entire coverage width can be obtained by coverage areas extending over an entire width, when viewed from the at least one running direction. The width can be defined between two outer coverage areas when viewed from the at least one running direction. Thus between said two outer coverage areas (viewed in the at least one running direction) a continuous/uniform coverage can be obtained.

It will be appreciated that the relative movement between the nozzle head and the surface on which the successive layer of the medium is applied can be carried out in different ways. For instance, the nozzle head can be moved with respect to said surface, or the surface (e.g. support, substrate, object, . . . ) can be moved with respect to the nozzle head. However, a combination is also possible, for example both the nozzle head and the surface may be moved with respect to each other to obtain the relative movement therebetween in the at least one running direction, in order to uniformly apply the successive layer of the medium.

It will be appreciated that the running direction can be unidirectional or bidirectional. In a bidirectional case, medium may be applied during the two runs of a back and forth relative movement. In a unidirectional case, medium may be applied during one of the back and forth relative movements. Hence a running direction may include both forward and backward movement, each complete movement being a "run" or a "stroke".

The running direction can be seen as a relative direction of movement of the nozzle head with respect to the surface on which the medium is to be applied (e.g. with respect to the support).

In an example, the deposition of the medium through each nozzle forms substantially a line (e.g. cylinder shape). A plane or area can be covered by means of the lines (cylinders), by allowing the coverage areas to be at least adjacent each other or allowing overlap of a path of the coverage areas in the at least one running direction.

It will be appreciated that also a plurality of successive layers can be applied after each other prior to performing a solidifying step.

In an example, ultraviolet light is concentrated on specific areas of a vat filled with the medium, e.g. a liquid photopolymer. Through the concentration of UV light, which is controlled by a controller (e.g. computer) that follows a preloaded CAD file, a layer of the medium, being a curable material, can be hardened one layer at a time. The hardened medium can be substantially solid.

According to a further aspect, the invention relates to a three-dimensional printed tangible object obtained by means of the method and/or system according to the current invention. An integral three-dimensional object can be generated from contiguous photo-hardened layers of medium each forming cross sectional portions of the object. The plurality of nozzles are configured to apply a new layer on top of a previously applied layer and/or previously formed configuration.

It will be appreciated that any of the aspects, features and options described in view of the method apply equally to the system and the described coater or additive manufacturing nozzle head. It will also be clear that any one or more of the above aspects, features and options can be combined.

BRIEF DESCRIPTION OF THE DRAWING

The invention will further be elucidated on the basis of exemplary embodiments which are represented in a drawing. The exemplary embodiments are given by way of non-limitative illustration. It is noted that the figures are only schematic representations of embodiments of the invention that are given by way of non-limiting example.

In the drawing.

DETAILED DESCRIPTION

Figure 1:
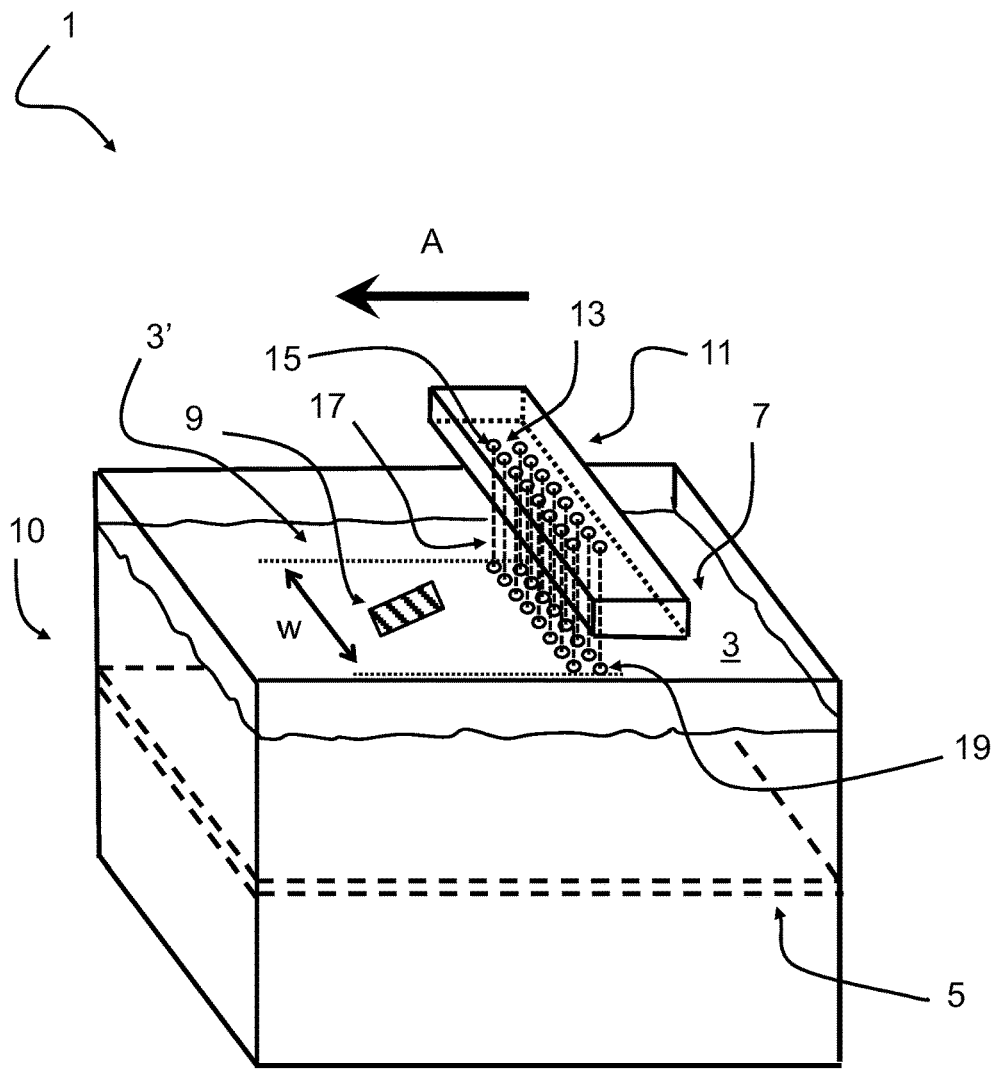
FIG. 1 shows a schematic diagram of an embodiment of a system.

FIG. 1 shows a perspective view of a schematic diagram of an embodiment of a system 1 configured for layerwise forming an object from a medium 3 capable of solidification. The object is built up layer per layer by repeatedly providing a layer of the medium 3 on a support 5 and/or an already formed part 9 of the object and by subsequently solidifying one or more predetermined areas of the layer of the medium 3 according to a specific pattern before a successive layer 7 is formed in a same manner. The successive layers 7 of the medium 3 are applied using a nozzle head 11 including a plurality of nozzles 13 being spaced apart from each other. Each nozzle has an opening area 15 through which, during application of the successive layer 7, a continuous stream 17 of the medium 3 is discharged for impinging a coverage area 19 on the layer of the medium on the support 5 and/or the already formed part 9 of the object. The plurality of nozzles 13 are arranged to provide non-intersecting continuous streams 17. The nozzle head 11 and the support 5 are relatively movable with respect to each other in at least one running direction A. In the at least one running direction A, the coverage areas 19 of the continuous streams 17 cover an entire coverage width W. In this example the nozzle head 11 is moved from right to left for applying a successive layer of the medium 3 on the upper surface of the medium 3 in container 10. However, in this example, an opposite running direction, from left to right, may also be employed for applying the layer of the medium 3 on the surface 3' on which the successive layer 7 is to be applied. The invention provides a way for applying a successive layer 7 of medium 3 with an improved height distribution or flatness. A more uniform layer of medium can be applied without requiring a long time.

The object can be fabricated or built by selective curing of successive films of curable medium (e.g. resin) formed separately from the object being formed. A thin film 7 of medium can be formed and selectively cured and hardened to form a layer 9 of an object of a predetermined pattern. The medium can be curable in response to stimulating radiation. The stimulation may be obtained by subjecting to prescribed energy.

The plurality of nozzles 13 are arranged such as to enable a complete coverage of an entire coverage width W, in order to enable a continuous and/or uniform application of a successive layer of medium 7. The arrangement of the plurality of nozzles 13 includes a nozzle pattern, nozzle size, nozzle orientation, nozzle spacing (pitch, offset). Additionally, the flowrate of the discharged medium and/or medium properties also determine whether a continuous stream/jet of medium is discharged. Optionally, the plurality of nozzles 13 include a nozzle edge wall. In this way, the risk of wetting or dripping can be significantly reduced. Additionally or alternatively, individual supplies or restrictions can enable multi-material applications or implementation in a control loop.

A medium mass flow discharged from a nozzle can be determined from the fluid velocity from the opening area 15 of the nozzle 13 and the surface area of the opening area 15. An indication of the layer thickness can be determined based on the medium mass flow and the relative speed of the nozzle 13 with respect to surface 3' on which the successive layer 7 is to be applied.

The continuous stream 17 discharged from a single nozzle 13 of the nozzle head 11 may be configured to deposit a line on the surface 3' or substrate on which the successive layer 7 of medium 3 is applied. This line corresponds to the path of the coverage area 19 of the continuous stream 17 impinging on the surface 3' or substrate, the path being formed as a result of the relative movement in the at least one running direction A. Advantageously, the plurality of continuous streams 17 obtained by means of the plurality of nozzles 13 result in different path lines on the surface 3' or substrate, wherein the path lines overlap or at least border each other in order to form a continuous layer of the medium 3 along an entire coverage width W. The applied successive layer 7 may not yet be completely uniformly distributed, and hence an additional step may be employed for even further improving the uniformity. By means of a wait time, gravitational effects on the applied medium may further reduce non-uniformity of the successive layer 7 of the applied medium.

Furthermore, it is desirable to obtain a continuous stream 17 discharged from a nozzle 13 which does not substantially deflect due to a relative movement between the nozzle 13 or nozzle head 11 and the surface 3' on which the successive layer 7 of the medium 3 is to be applied (e.g. medium layer 3, already hardened object layer 9, substrate, support 5). However, this may be allowed to some extent if all the continuous streams 17 are bent at substantially a same angle.

Ambient air can collide with the continuous streams 17 (cf. stagnation pressure), which can cause the continuous streams 17 to bend and even break (i.e. non-continuity), which would be detrimental to the deposition of the successive layer 7 of the medium 3. Optionally, the nozzle head 11 is moved with respect to the surface 3' on which the successive layer 7 of the medium 3 is to be applied, wherein a shield (not shown) is used for reducing the aerodynamic influence of ambient air on the continuous streams 17.

If during use the nozzle head 11 is placed close to the surface 3' on which the successive medium 7 is applied, the plurality of continuous streams 17 discharged from the nozzles 13 may deflect in the direction of the relative movement between the nozzle head 11 and said surface 3', i.e. in the running direction A. This deflection can be reduced by increasing the distance between the nozzles 13 and said surface 3'. In this way, the continuous streams 17 may remain substantially straight, not being deformed by said moving (medium) surface.

In the exemplary embodiment of FIG. 1, the nozzle head 11 has a specific multi nozzle pattern. Many possible nozzle configurations are possible. In this nozzle configuration, each nozzle array is adjacent to or overlaps with respect to a previous nozzle array seen in the at least one running direction, in order to enable a complete and continuous coverage over the entire coverage width W. As a result of this overlap, multiple continuous streams can form a continuous and substantially uniform successive layer when the plurality of nozzles and the surface 3' on which the successive layer 7 of medium 3 is applied are relatively moved with respect to each other. Non-uniformity or unflatness can be effectively minimized by employing an optimal centre to centre pitch between the nozzles in an array. In an example, a pitch of around 1.5-1.9 times the nozzle radius times a total number of arrays of the plurality of nozzle arrays is proven to be advantageous for applying a continuous uniform successive layer 7 of the medium 3, for nozzles having a spray angle of substantially 0 degrees. It will be appreciated that the nozzle pitch and/or the nozzle diameter can be altered to adjust the resulting layer thickness profile, as desired. In an example, the pitch between two arrays (i.e. offset) is chosen to be 3 to 5 times the nozzle diameter, in order to prevent collision of the continuous streams discharged from the plurality of nozzles in case these streams (cf. jets) are bent by the motion of the nozzle head and/or the surface on which the successive layer is applied. It will be appreciated that other pitch distances can be chosen. It will be appreciated that the nozzles may have other configurations, as long as the coverage areas provided by the plurality of discrete non-intersecting continuous streams cover the entire coverage width.

It will be appreciated that an angle of the continuous streams discharged from the plurality of the nozzles can be adjusted in order to reduce the force exerted by the continuous stream impinging on the surface on which the medium is applied.

Figure 2:
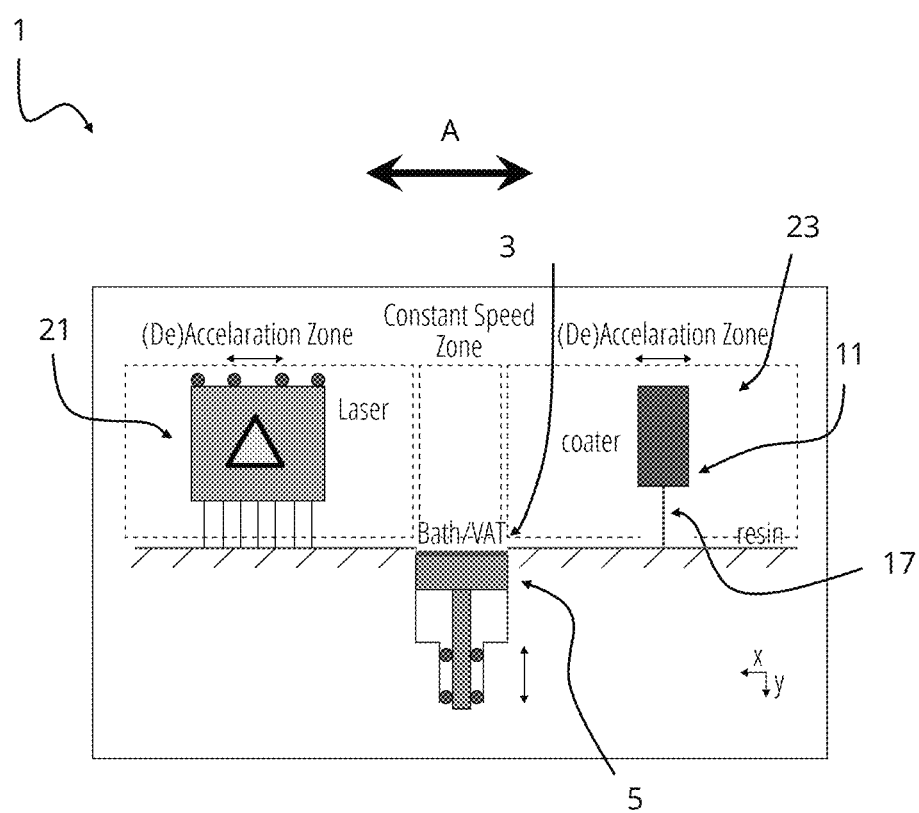
FIG. 2 shows a schematic diagram of an embodiment of a system.

FIG. 2 shows a side view of a schematic diagram of an embodiment of a system 1. The system 1 can be used in stereolithography for the production of three-dimensional objects, parts, structures, article. The system 1 can be used for automatically building complex three-dimensional objects by successively solidifying a plurality of thin medium layers. The fluid-like medium 3 being solidifiable by exposure to appropriate stimulation. The successive applied medium layers 7 are solidified/hardened on top of each other, according to a predetermined pattern, until all of the thin layers are created to form a whole three-dimensional object. In an example, the fluid medium 3 is a liquid photo-polymer resin that can be polymerized and solidified by exposure to ultraviolet (UV) radiation. Each polymerized medium layer forms a thin cross section of the desired three-dimensional object. Other types of materials can also be used. Many variants are possible.

For example, the polymers as the medium 3 can be cured by UV light, with the curing rates fast enough using reasonably available UV light. An ultraviolet laser 21 is arranged for generating a small intense spot of UV which is moved across the medium surface in a predetermined pattern. The system 1 is controlled by a computer (not shown) and precise complex patterns can be manufactured.

The system 1 further includes a coater 23 for applying a layer of the medium 3, the coater 23 comprising a nozzle head 11 including a plurality of nozzles 13 being spaced apart from each other (not shown), each nozzle 13 having an opening area through which a continuous stream 17 of the medium 3 is dischargeable for impinging a coverage area 19 on a support 5, a layer of the medium on the support and/or an already formed part of the object. The plurality of nozzles 13 are arranged in such a way to prevent intersection between the continuous streams 17 being discharged therefrom. The nozzle head 11 is relatively movable with respect to the support 5 in at least one running direction A. The nozzle head 11 is configured to discharge, through the plurality of nozzles 13, continuous streams 17 having coverage areas 19 which cover an entire coverage width W in the at least one running direction A. The support can be moveable in the vertical direction. By means of the nozzle head 11 a thin, substantially uniformly-thick volume of medium (e.g. liquid resin) can be selectively applied on a surface.

Figure 3:
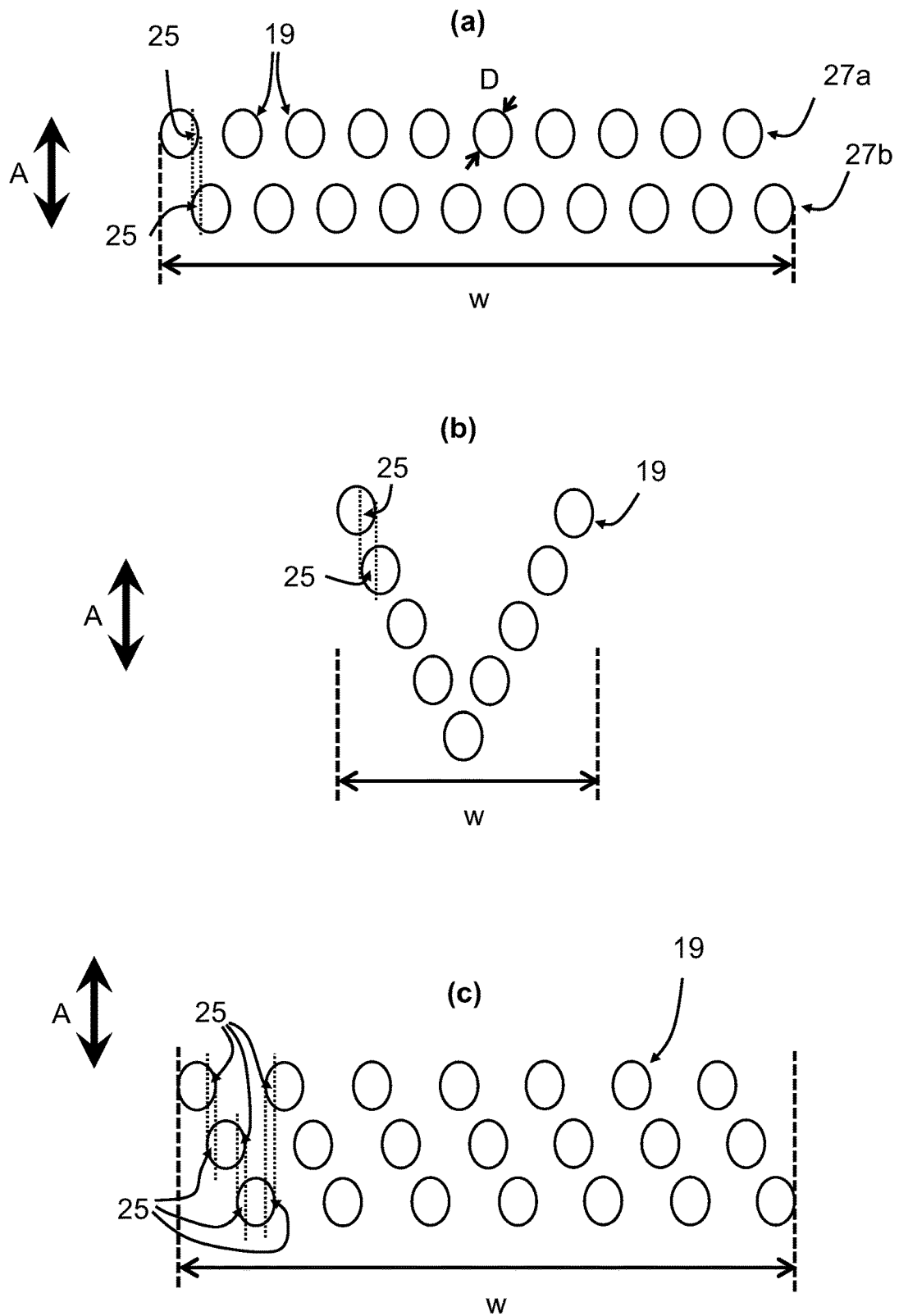
FIG. 3 shows a schematic diagram of coverage areas on a surface.

FIG. 3 shows a top view of schematic diagrams of coverage areas 19 on a surface 3' on which the successive layer 7 of the medium 3 is applied. In FIG. 3(*a*)-(*c*), the coverage areas 19 are substantially circular in shape in the shown embodiment, however, other shapes are also possible. Many shape variants are possible.

Each of the plurality of the nozzles 13 may be configured to deposit a continuous path of medium along a continuous line. The path may be straight or curved depending on the at least one running direction A.

The individual continuous streams 17 ejected from the plurality of nozzles 13 are separated sufficiently such as to prevent intersection or contact therebetween, even during relative movement in the at least one running direction A. Also the distance to the surface on which the successive layer of the medium is applied (i.e. the length of the continuous stream) is chosen such as to obtain unbroken continuous streams 17.

The coverage areas of the continuous streams 19 cover an entire coverage width W in the at least one running direction A. Furthermore, paths of the coverage areas 19 of the continuous streams 17 discharged from the plurality of nozzles 13 in the at least one running direction A at least partially overlap. Overlapping regions 25 are formed seen in the at least one running direction. As a result of the overlap between paths of neighboring coverage areas, a more uniform distribution of the medium 3 can be obtained when applying the successive layer 7.

In FIG. 3(*a*), the nozzle head 11 includes a plurality of nozzles 13 which are configured to, during use, provide a plurality of coverage area 19 arrays 27*a*, 27*b*, which are offset from each other. The plurality of coverage area 19 arrays 27*a*, 27*b* are arranged in at least a first coverage area 19 array 27*a* and a second coverage area 19 array 27*b*, wherein in the at least one running direction A paths of the coverage areas 19 of the continuous streams 17 of the nozzles forming the first array at least partially overlap with respect to paths of the coverage areas 27*b* of the continuous streams 17 of the nozzles of the second array.

Next to a dual row configuration as shown in FIG. 3(*a*), other coverage area 19 configurations can also be employed. Exemplary embodiment of FIG. 3(*b*) shows a V-shaped coverage area 19 pattern relatively moveable in the running direction A. The plurality of coverage areas cover an entire coverage width and also include overlapping regions 25 seen in the running direction A. As a result, paths of the coverage areas 19 will overlap which can result in a substantially uniform application of the successive layer 7 using the plurality of nozzles 13.

In the exemplary embodiment of FIG. 3(*c*), a triple row configuration is shown. The coverage areas 19 in the subsequent arrays are shifted such that partial overlapping regions 25 are formed. In the at least one running direction A, the coverage areas 19 of the continuous streams 17 cover an entire coverage width W and paths of the coverage areas 19 of the continuous streams 17 discharged from the plurality of nozzles 13 in the at least one running direction A, at least partially overlap along the overlapping regions 25.

The pitch distance of coverage areas in an array can be equal to D*N*(0.5 to 1), with D being the diameter of a coverage area, N being the total number of arrays/rows of the nozzle head and (0.5 to 1) being a range. The plurality of nozzle arrays of the nozzle head may be distanced from each other in the at least one running direction. The plurality of nozzles in a single array may be distanced at a pitch in a direction transverse to the at least one running direction. In this way, a matrix of nozzles can be obtained. Optionally, the nozzle arrays are shifted from each other in the direction transverse to the at least one running direction. A similar configuration can be obtained for the coverage areas. It will be appreciated that other configurations, e.g. not using arrays in straight lines, can be used.

In an example, for each individual nozzle in a column an overlap of 0.5 to 1 times the diameter applies. The distance between the first nozzle of a first column and the first nozzle of the next column can be N*D*[0.5 to 1], where N is the total number of arrays of the nozzle head (offset from each other in the at least one running direction).

The distance between arrays in the at least one running direction can be chosen such as to prevent the continuous streams from moving each other during movement in the at least one running direction (i.e. direction of movement). In an example, the distance is chosen to be larger than 1.5*D, more preferably, larger than 2*D, even more preferably larger than 3*D. For example, the arrays may be distanced in the at least one running direction at 4*D. Other ranges/values are also envisaged.

Figure 4:
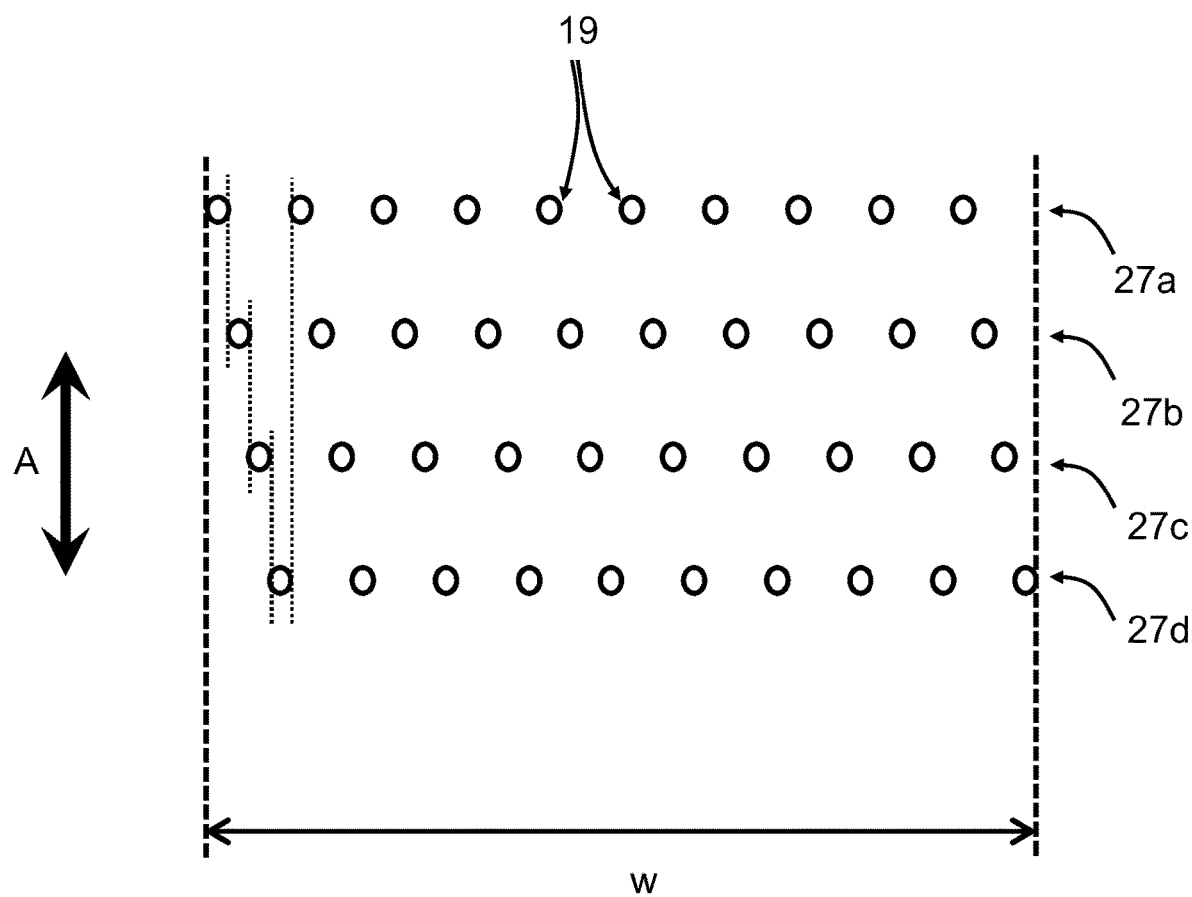
FIG. 4 shows a schematic diagram of coverage areas on a surface.

FIG. 4 shows a top view of a schematic diagram of coverage areas 19 impinging on a surface 3' on which the successive layer 7 of medium 3 is applied. In this example, the coverage areas 19 are free of overlapping regions. In this way, the paths of the coverage areas in the at least one running direction A are non-overlapping. However, the configuration of the coverage areas 19 is chosen in such a way that said paths are adjacent each other in the at least one running direction A. In this way, the coverage areas 19 of the continuous streams 17 cover the entire coverage width W and the medium 3 can be discharged in a continuous fashion along the complete coverage width W.

In this example, the coverage area 19 configuration includes four arrays or rows, 27a, 27b, 27c, 27d. It will be appreciated that a different number of arrays or rows may be employed.

Figure 5:
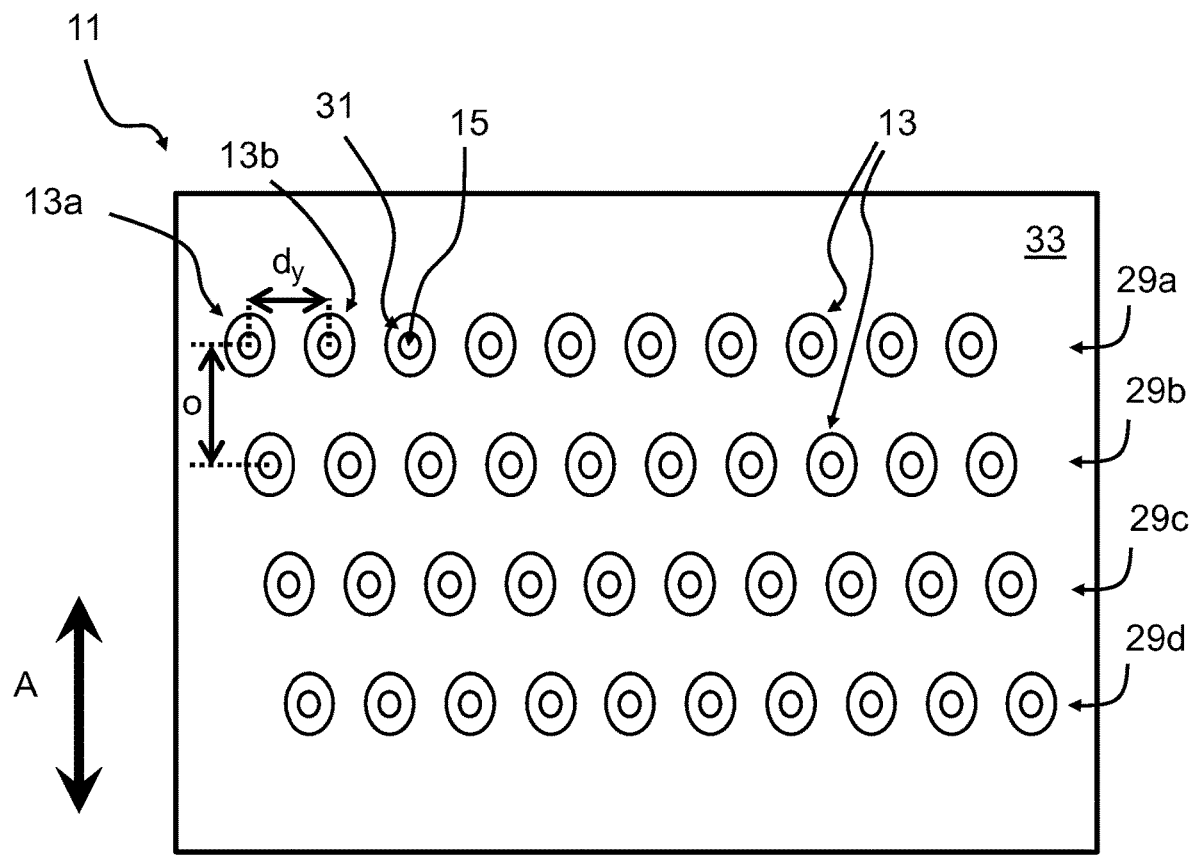
FIG. 5 shows a schematic diagram of an embodiment of a nozzle head.

FIG. 5 shows a bottom view of a schematic diagram of an embodiment of a nozzle head 11. Multiple nozzles 13 are arranged on a nozzle head 11, forming a pattern for depositing a continuous layer of medium 3 when relatively moved in the at least one running direction A with respect to the surface 3' on which the successive layer 7 is to be applied. The nozzle head 11 includes a plurality of nozzle arrays 29a, 29b, 29c, 29d which are offset from each other. The plurality of nozzle arrays 29a, 29b, 29c, 29d are arranged such that in the at least one running direction the opening areas 15 of the nozzles 13 of the nozzle arrays are adjacent to each other or partially overlap. The nozzles 13 in an array 29a, 29b, 29c, 29d are distanced at a nozzle pitch dy being measured from a center point of an opening area of a first nozzle 13a to a center point of an opening area of an adjacent nozzle 13b in a same array. The pitch can be chosen in order to improve the uniform or even application of the successive layer 7 of the medium 3. Furthermore, nozzles 13 of neighboring arrays are offset at an array pitch o in the at least one running direction A, the array pitch being measured from a first line going through center points of opening areas of the nozzle of the first array to a second line going through center points of opening areas of nozzles of the second array. The array pitch o can be chosen in order to avoid intersection or contact between the continuous streams relative movement of the scan head 11 with respect to the surface 3' on which the successive layer 7 is applied. In an example, the plurality of nozzles 13 of the nozzle head 11 are arranged to selectively dispense a continuous stream of the medium 3, the nozzles having an adjustable flow rate for discharging the medium. Flowrate per nozzle 13 can be adjusted by adding individual adjustable restrictions (microfluidic valves or heater element per nozzle).

Groups or individual nozzles could be supplied from separate reservoirs to enable multi-material recoating. For example, at least two subsets of the plurality of nozzles 13 can be configured to provide different materials, wherein a first subset is in fluid communication with a first reservoir containing a first material and the second subset is in fluid communication with a second reservoir containing a second material.

In an example, a control loop may be employed in which a thickness of a successive applied medium layer is checked by means of a sensing device. First, a height profile of the upper layer or surface is measured, after which the medium is applied using the nozzle head 11. The height profile can be compared with a desired height profile, and the medium discharged by the plurality of nozzles 13 of the nozzle head 11 can be selected or adjusted in order to compensate for the differences between the measured height profile and the desired height profile.

The opening area 15 of the nozzle forms a nozzle orifice or nozzle exit. Each of the plurality of the nozzles 13 of the scan head 11 shown in FIG. 5 further includes an edge wall 31 extending around its opening area 15. The nozzle edge wall 31 may extend around the opening area 15 in order to prevent wetting around the nozzles 13, which could potentially result in the formation of drops. Wetting is mainly a problem at lower flow rates being discharged from the opening areas of the nozzles. In this example, the nozzle edge walls 31 are cylindrical.

The plurality of nozzles 13 of the nozzle head 11 may be arranged in a flat plate 33. The edge walls 31 of the plurality of nozzles 13 may extend out with respect to the plate 33 in order to prevent wetting of said plate. Wetting of the plate is preferably prevented in order to prevent formation of drops of medium thereon, which could fall back on the surface on which the successive layer of medium is applied, which would be detrimental for the uniformity or flatness of the applied successive layer 7. The nozzle edge wall 31 can effectively prevent the continuous stream 17 being discharged from the opening area 15 to grow further (which could lead to the formation of a drop of the medium 3).

Additionally or alternatively, the flat plate 33 may have a hydrophobic coating such that it is prevented that the medium can adhere to it.

This nozzle arrangement of the nozzle head 11 can be used for creating a three-dimensional object through stereolithography, wherein first, by means of the plurality of nozzles, a thin layer of medium 3 is applied on a previous layer (liquid or previously solidified). The thin layer of medium may be a liquid polymerizable resin capable of solidifying upon exposure to stimulation (e.g. UV radiation). Subsequently, a next layer of the object can be formed by at least partially solidifying at least one selected portion of the last applied layer of medium (i.e. upper layer) by exposing said at least one portion to the stimulation. The at least one portion corresponds to the cross-sectional shape at a given point of said object.

In an example, the nozzle arrays are spaced between 1000 and 10000 micrometers apart (i.e. nozzle array pitch). The diameter of the opening area of a nozzle may for example be in the range of 250 to 450 micrometer.

Figure 6:
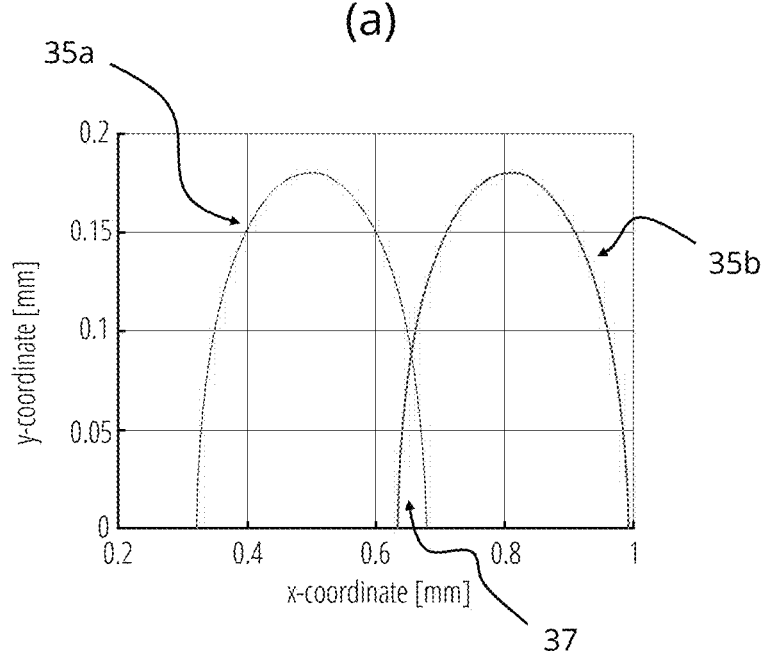
FIG. 6 shows deposition layer thickness plots.
Figure 6:
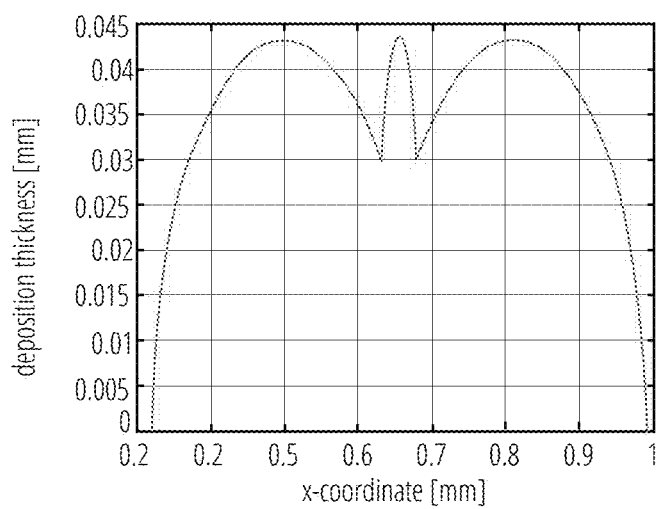

FIG. 6 shows deposition layer thickness plots. An optimal pitch between neighboring nozzles may be selected in order to improve the uniformity of the applied successive layer of medium. In FIG. 6(a), a plot for a layer thickness is shown for coverage areas with overlapping paths in the at least one running direction. In this example, the paths of neighboring coverage areas have an overlap of 1.73 the radius of the coverage area (or the opening area if the spray angle is 0 degrees) times a total number of arrays of the plurality of nozzle arrays. A first coverage area results in a first medium distribution 35a, and a second, neighboring coverage area result in a second medium distribution 35b. There exists an overlap region 37 between the first medium distribution 35a and the second medium distribution 35b. In FIG. 6(b) a resulting layer thickness profile is illustrated (summation of contribution of both coverage area paths in the running direction). A substantially uniform layer thickness profile is obtained. The optimal pitch in this example is dependent on various process variables such as but not limited to the opening area radius, the spray angle, the nozzle angle, the nozzle orientation, the fluid properties of the medium, etc. The applied successive layer of medium can subsequently be hardened/solidified by exposure to a synergistic radiation to form a solid or hardened layer of the part being built.

Figure 7:
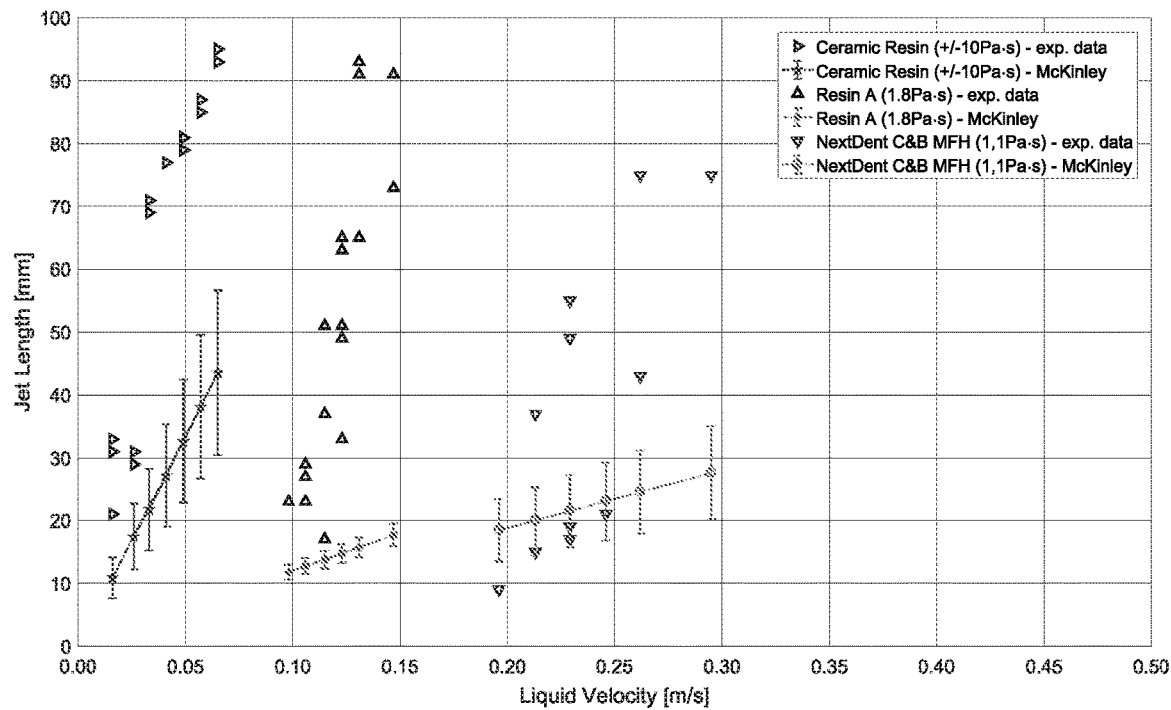
FIG. 7 shows a graph for a continuous stream length versus a medium velocity.

FIG. 7 shows a graph for a continuous stream length versus a medium velocity, which provides an indication of a medium deposition stability. Downstream of each of the plurality of nozzles 13 a stable fluidic circular continuous stream 17 can be created which comes in contact with the surface 3' on which the successive layer is to be applied (e.g. medium bath or constraint surface). A layer thickness of the deposited successive layer 7 of the medium 3 can be controlled by the ratio of flowrate and scan velocity (i.e. velocity of the plurality of nozzles 13 in the at least one running direction A). Advantageously, the plurality of nozzles 13 can be configured such that the working distance, i.e. the distance between the nozzle opening area 15 (i.e. exit orifice) and the surface 3' on which the successive layer 7 of medium 3 is applied, is smaller than a critical break up length. As illustrated in the graph of FIG. 7, experiments have shown that a stable continuous stream 17 can be obtained for certain medium discharge flowrates. For example, for a nozzle diameter of approximately 360 micrometer a stable jet length of at least 10 mm can be obtained for acceptable medium velocities. This length is more easily obtained, in terms of medium velocity, for high viscous liquids, which is desired for having a thin medium layer.

The continuous stream length (vertical axis) in function of the medium flow velocity (horizontal axis) is shown for different types of resins (i.e. medium). The different resins have a different viscosity. By employing a resin with a high viscosity, it is possible to obtain a continuous stream 17 at a lower flow velocity. The lines in the graph are steeper, meaning that a more medium flow velocity means a considerably larger continuous stream length. In this way, the medium velocity discharged from the plurality of nozzles 13 can be chosen such as to ensure that the continuous streams are stable and do not break at least until contact with the surface 3' on which the successive layer 7 of the medium 3 is applied.

Figure 8:
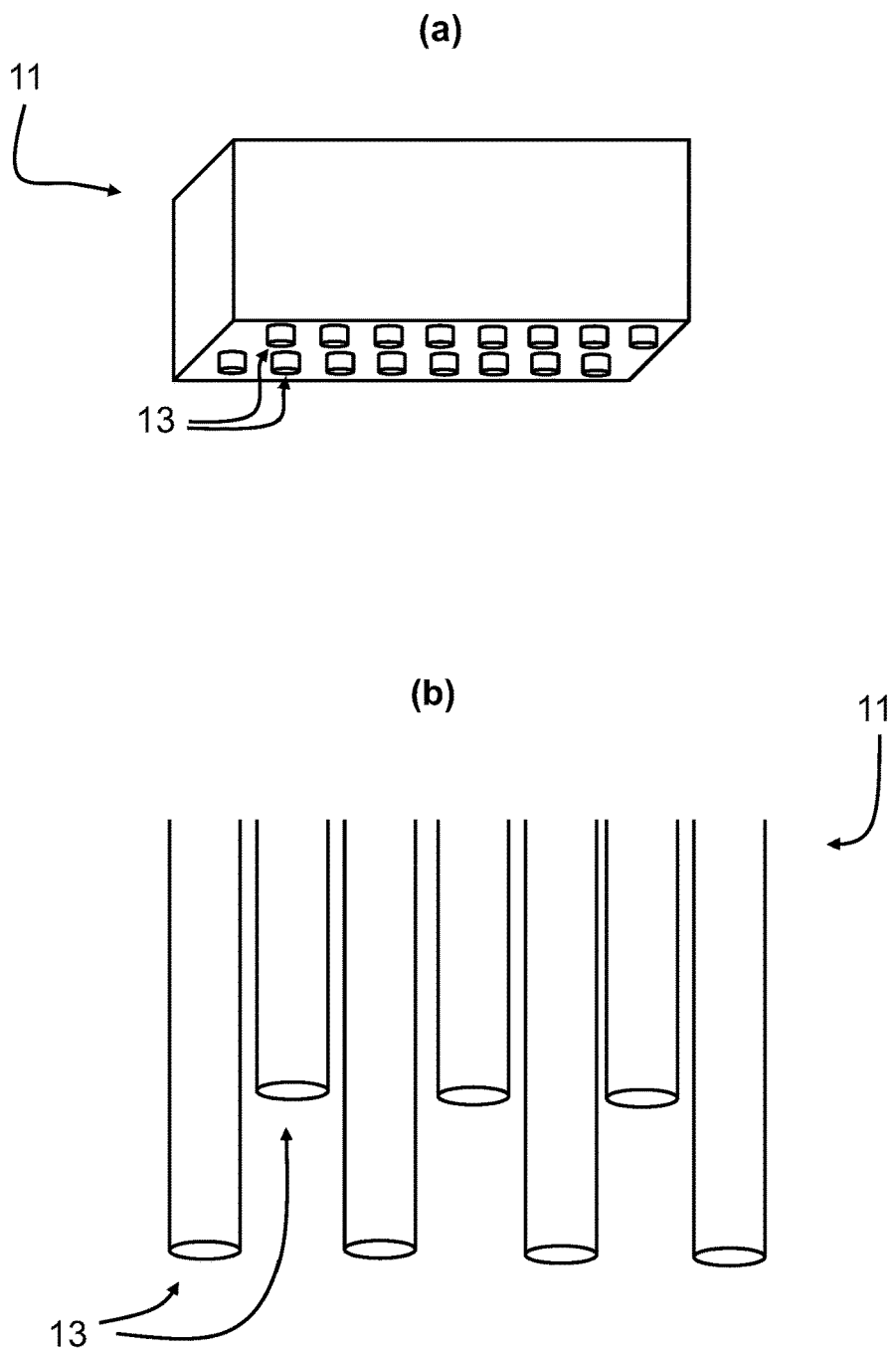
FIG. 8 shows a schematic diagram of embodiments of nozzle heads.

FIG. 8 shows a perspective view of a schematic diagram of exemplary embodiments of the nozzle head 11. In FIG. 8(*a*), the nozzle head 11 is an integral medium emitting/ejecting means including the plurality of nozzles 13, which may be independent nozzles. The nozzle head 11 may form a monolithic integral structure. The nozzle head may also include other features, such as a laser as the solidification means. In this way, a more compact design of the stereolithographic system can be obtained. In FIG. 8(*b*), the nozzle head 11 is formed by a plurality of discrete nozzles 13 being held together, for example by holding means. In the nozzle heads of the embodiments of FIGS. 8(*a*) and (*b*), in the at least one running direction A the coverage areas 19 of the continuous streams 17 cover an entire coverage width W. Additionally, the paths of the coverage areas 19 of the continuous streams 17 discharged from the plurality of nozzles 13 in the at least one running direction A are adjacent each other or at least partially overlap. In this way, a substantially even or uniform distribution of the successive layer 7 of the medium 3 can be obtained.

Figure 9:
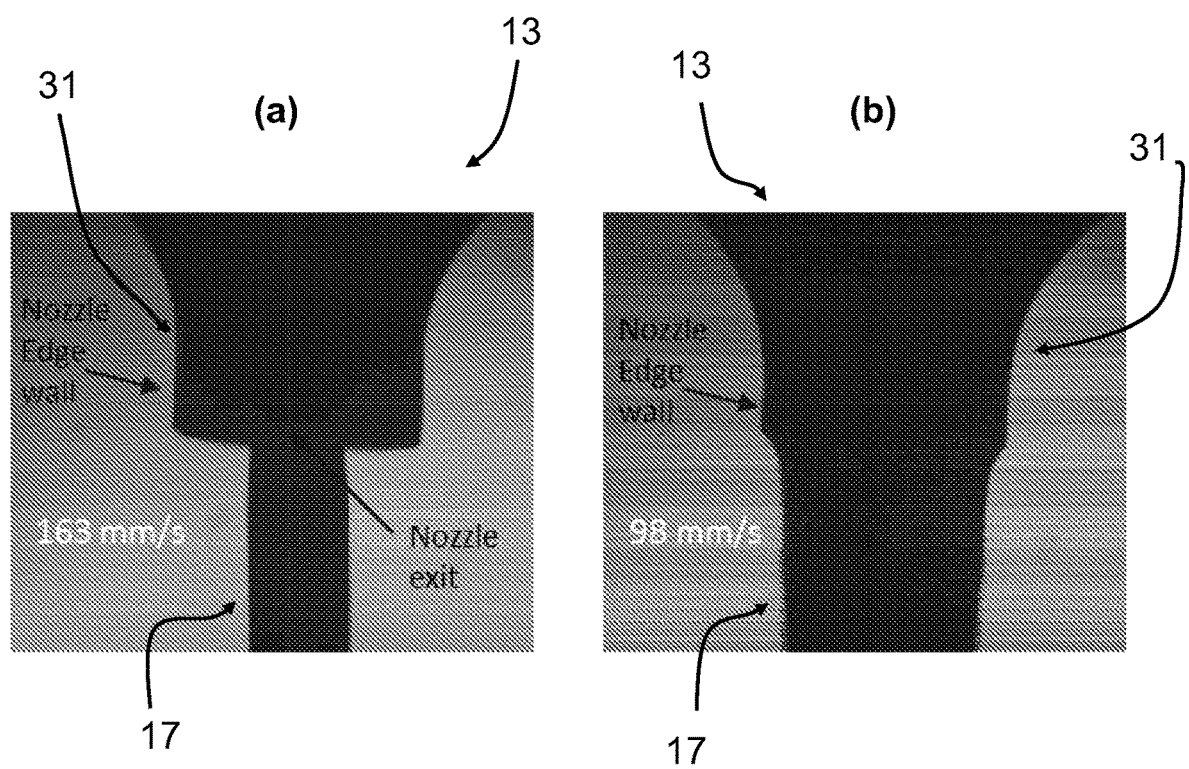
FIG. 9 shows side views of a nozzle with an edge wall.

FIG. 9 shows a side view of a nozzle 13 with an edge wall 31 for two different flow velocities of the medium discharged from the nozzle 13. The edge wall 31 may have various shapes. For instance, the edge wall 31 may also be formed by a bulge. Other shapes can also be employed (e.g. sharp edge). The edge wall 31 may further be combined with a hydrophobic coating.

Figure 10:
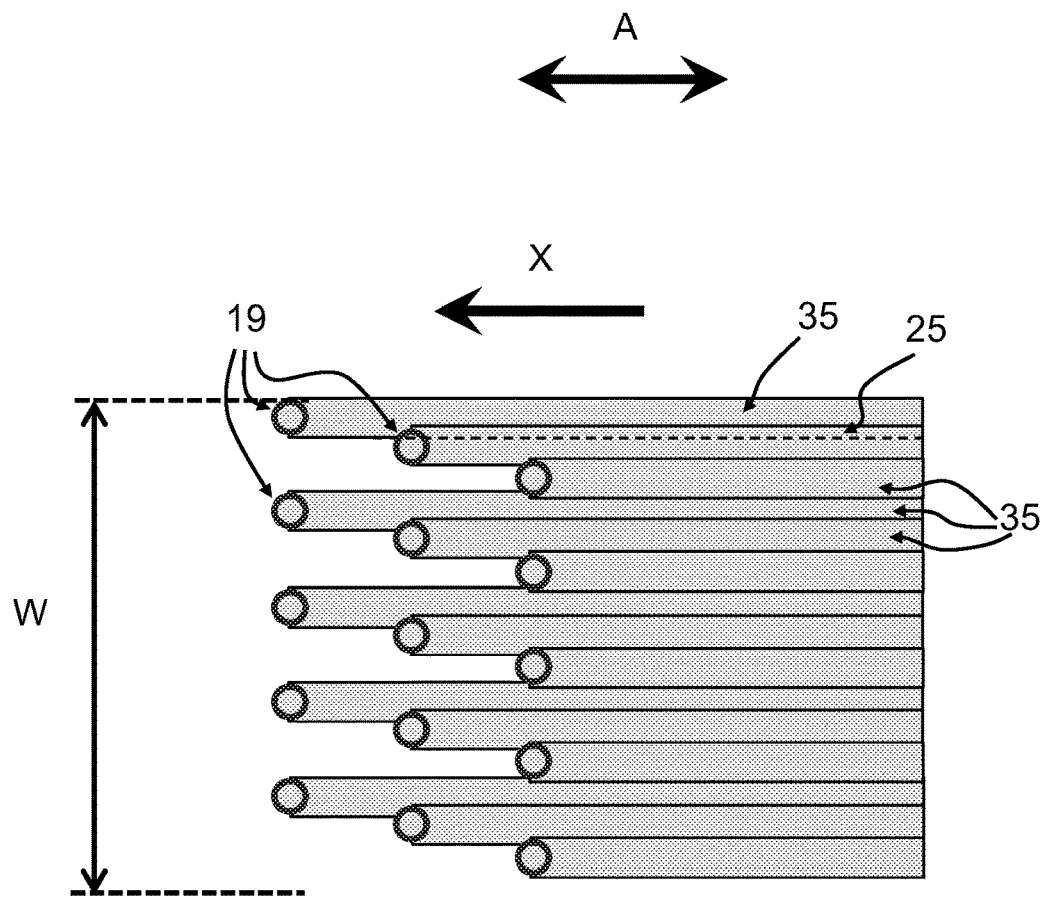
FIG. 10 shows a top view of coverage areas with paths.

FIG. 10 shows a top view of coverage areas 19 with paths 35. The paths of the coverage areas 19 are obtained by relative movement of the coverage areas in a running direction A. In this example, a triple row configuration is shown. The coverage areas 19 in the subsequent arrays are shifted such that partial overlapping regions 25 are formed. In the at least one running direction A, the coverage areas 19 of the continuous streams 17 cover an entire coverage width W and paths of the coverage areas 19 of the continuous streams 17 discharged from the plurality of nozzles 13 in the at least one running direction A, at least partially overlap along the overlapping regions 25. In the shown example, the coverage areas 19 and the surface on which the medium is applied are relatively moved in a direction X, resulting in their respective partially overlapping paths 35. In this way, a complete coverage can be obtained by performing a single stroke or run in direction X.

Figure 11:
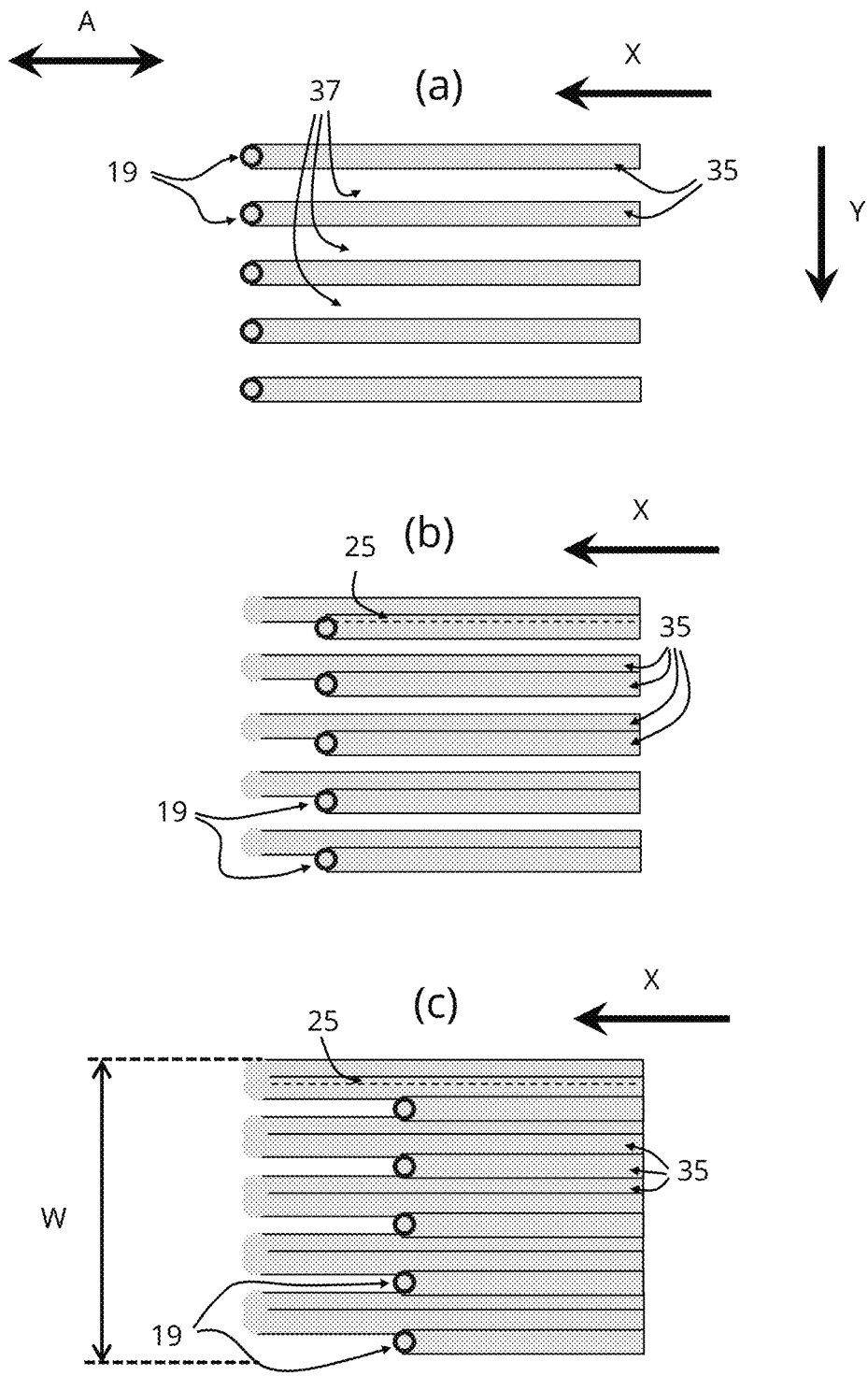
FIG. 11 shows top views of coverage areas with paths.

FIG. 11 shows top views of coverage areas 19 being relatively moved in a running direction forming paths 35, at different time steps. In this example, there is no overlap of the coverage areas 19 seen in the running direction. A successive layer is provided by performing a plurality of runs (see figs. (a)-(c) respectively) in the at least one running direction A. FIG. 11(*a*) shows a first run, wherein paths 35 of the coverage areas 19 of the continuous streams discharged from the plurality of nozzles 13 in the at least one running direction A are distanced from each other with non-covered regions 37 therebetween. The non-covered regions 37 are subsequently covered by performing one or more additional runs (see FIGS. 11(*b*),(*c*)), wherein prior to performing the one or more additional runs, the coverage areas 19 are shifted in a direction transverse to the running direction Y such that the paths 35 of the coverage areas 19 during the additional run cover at least a portion of the non-covered regions 37.

Hence, during the additional successive runs the coverage areas can be relatively shifted in order to completely cover previously non-covered regions 37 from the first run. In this way, a uniform applied layer of the medium can be obtained. In the shown example, during the initial run a line pattern is deposited having a predetermined pitch. The plurality of coverage areas are relatively moved transverse to the running direction (Y-direction). In this example, the nozzle head is shifted half a pitch. However, other shifts can also be performed. Next, as shown in FIG. 11 (*b*), an additional run, i.e. a second recoat stroke, is performed in order to deposit a line pattern in at least portions of regions 37 that have not previously been covered by performing the initial run. In a further additional run, i.e. a third recoat stroke, the a line pattern is deposited such as to cover an entire coverage width W. The nozzle head can then be moved back traverse to the running direction (e.g. Y direction) prior to repeatedly performing the above steps for applying the next successive layers.

Figure 12:
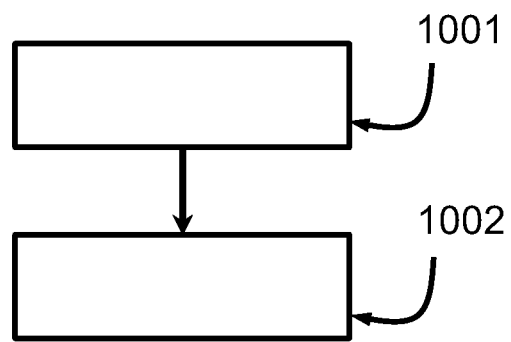
FIG. 12 shows a schematic diagram of a method.

FIG. 12 shows a schematic diagram of a method 1000 for layerwise forming an object from a medium capable of solidification. In a first step 1001, the object is built up layer per layer by repeatedly providing a layer of the medium on a support and/or an already formed part of the object. In a second step 1002, subsequently one or more predetermined areas of the layer of the medium is solidified according to a specific pattern before a successive layer is formed in a same manner. These steps are repeatedly performed in order to layerwise form the object having a desired geometry. Furthermore, the successive layers of the medium are applied using a nozzle head including a plurality of nozzles being spaced apart from each other. Each nozzle has an opening area through which, during application of the successive layer, a continuous stream of the medium is discharged for impinging a coverage area on the layer of the medium on the support and/or the already formed part of the object, wherein the plurality of nozzles are arranged to provide non-intersecting continuous streams. The nozzle head and the support are relatively movable with respect to each other in at least one running direction, and in the at least one running direction the coverage areas of the continuous streams cover an entire coverage width.

The path of the coverage area of the continuous stream provided by a nozzle, along the at least one running direction, can be considered as a continuous medium delivery pathway which together with other continuous medium delivery pathways of other nozzles of the nozzle head applies a uniform layer of medium. The method enables contactless deposition of high viscous resins with an advantageous height distribution or uniformity.

The medium may have a photosensitive composition which can be hardened by providing an exposure. The method and system according to the current invention can be used for producing objects for high tech markets, space markets, medical and dental industry, electronics industry, etc.

Figure 13:
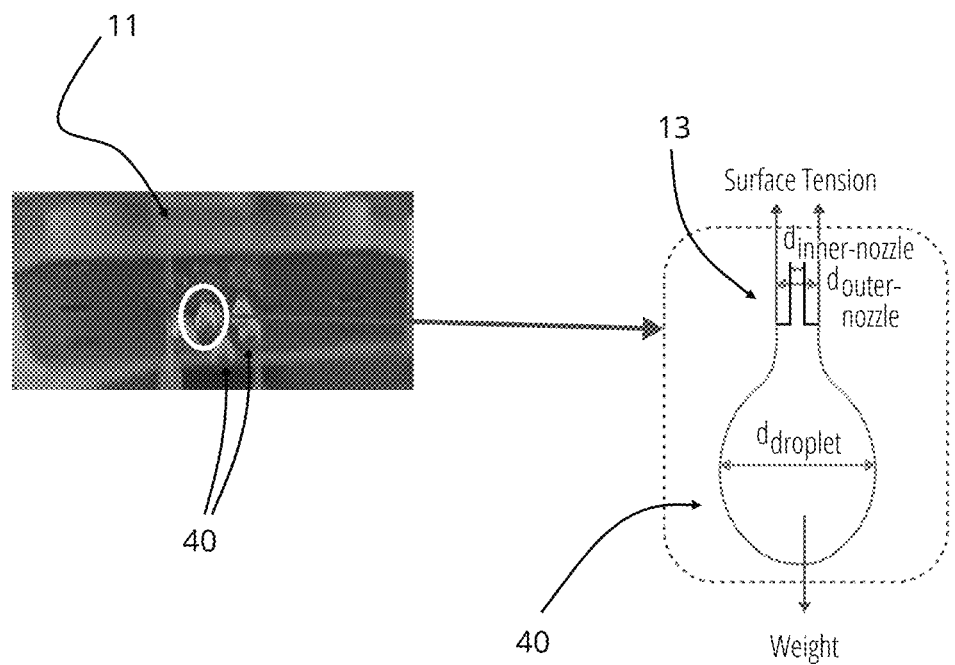
FIG. 13 shows droplet formation at nozzles.

FIG. 13 shows droplet formation at nozzles. In order to prevent droplets 40 formed at the nozzles from touching each other, for instance when starting the recoating process, a minimum center to center distance can be chosen between the neighboring nozzles.

It will be appreciated that the minimum distance may depend on various factors, such as for example the arrangement of the nozzles, configuration of the recoater, the resin(s) used for recoating, the nozzle diameter, density and surface tension of the resin, etc. In an embodiment, the minimum center to center distance is at least 1.8 mm, more preferably at least 2 mm, even more preferably at least 2.2 mm.

Various nozzle center to center distance can be chosen in order to prevent formed droplets 40 formed at the nozzles from touching each other. However, in many practical cases this can be guaranteed when the minimum nozzle center to center distance≥2.5 mm. The weight of the fluid can be balanced by the surface tension force:

$$\frac{4}{3}\pi d_{droplet}^3 \frac{1}{8}\rho g = \pi d_{outer-nozzle}\sigma$$

$$d_{droplet} = \sqrt[3]{\frac{6 d_{outer-nozzle}\sigma}{\rho g}}$$

$$\sigma = 33 \text{ mN/m}$$

$$d_{outer-nozzle} = 760 \text{ } \mu m$$

$$\rho = 1100 \frac{kg}{m^3}$$

$$d_{droplet} = 2.407 \text{ mm (Theoretical)}$$

$$d_{droplet} \sim 2.2 \text{ mm (Experimental)}$$

The above gives for an exemplary embodiment an indication of a minimum center to center distance of two neighboring nozzles for preventing contacting droplets at the nozzles.

Figure 14:
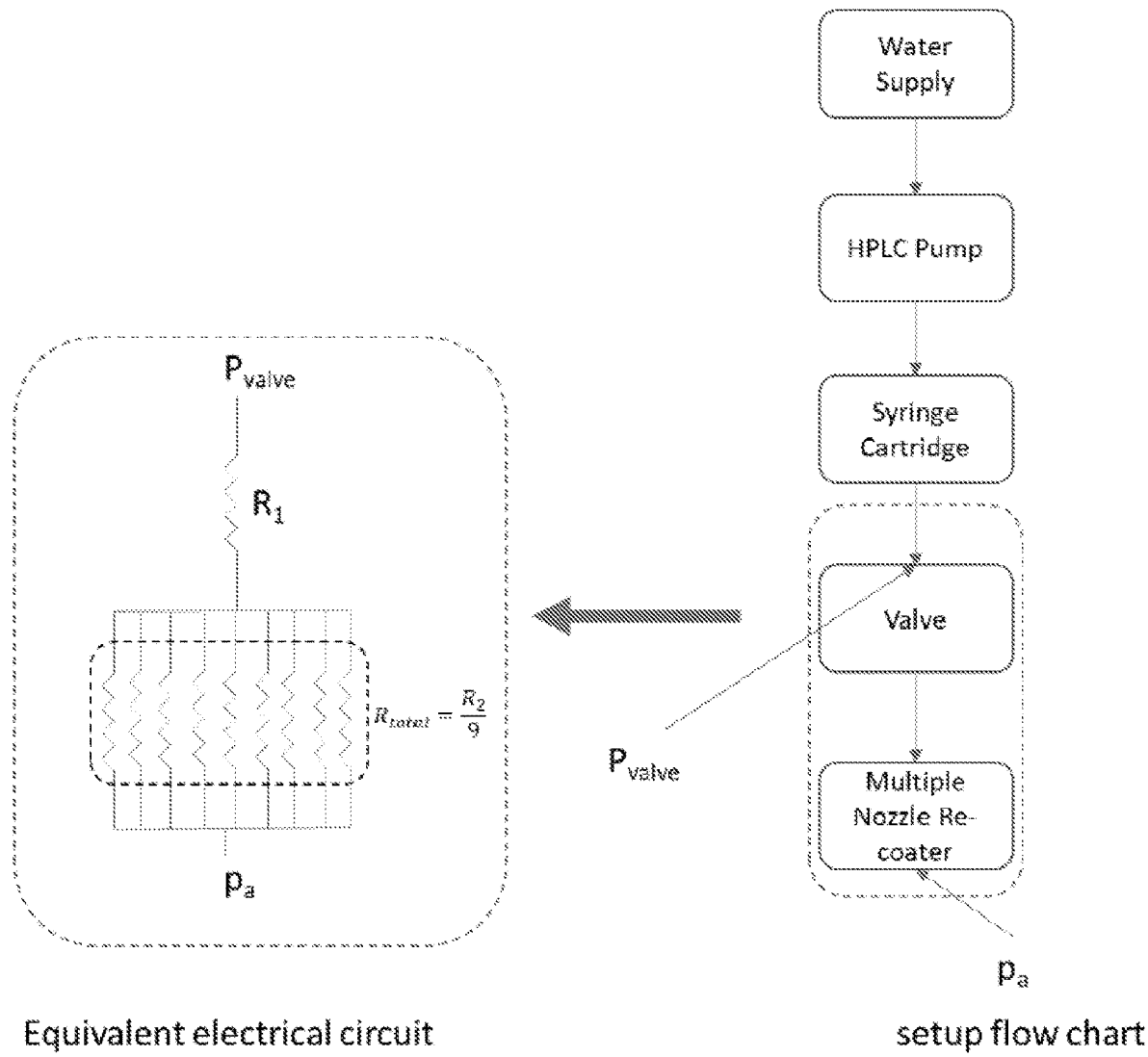
FIG. 14 shows an a schematic diagram of an exemplary setup.

FIG. 14 shows an a schematic diagram of an exemplary setup. In an embodiment, the setup can be configured to generate a discharge flow through the nozzles including a flow pulse. The flow pulse can be provided during initial commencement of discharging of the continuous stream of medium. The pulse may result in a peak in the flow velocity during start up of discharging of the continuous stream of medium through the nozzles.

In an example, prior to discharging the continuous stream of the medium through the nozzles, pressure is built up such as to obtain a pulse in the velocity of the flow during initial discharging. An initial peak flow can be obtained when discharge of the resin through the nozzle is started. In this way, an advantageous discharge start up method can be obtained.

Even if the center to center distance is rather small, e.g. smaller than 2.2 mm, a jet can still be created by closing a valve in the supply to the nozzle head before the pump is switched on. As a result of closing the valve, fluid pressure can build up. By subsequently opening the valve, a pressure pulse or flow pulse is created, creating a jet instantaneously.

Build up pressure can ensure direct entry into the jetting regime to prevent the jets from interacting with each other resulting into emanation of individual jets. In FIG. 14, $P_{valve}$ is the pressure at resin inlet of the valve, $P_a$ is the ambient pressure, $R_1$ is the hydraulic resistance from valve to the nozzles, and $R_2$ is the hydraulic resistance at the nozzles.

Figure 15:
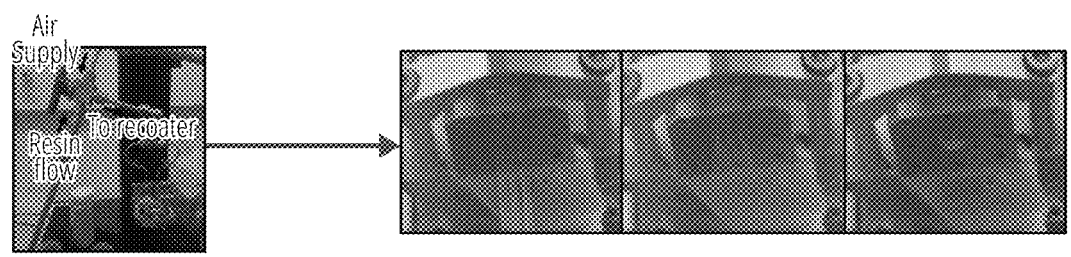
FIG. 15 shows an a schematic diagram of an exemplary setup.
Figure 15:
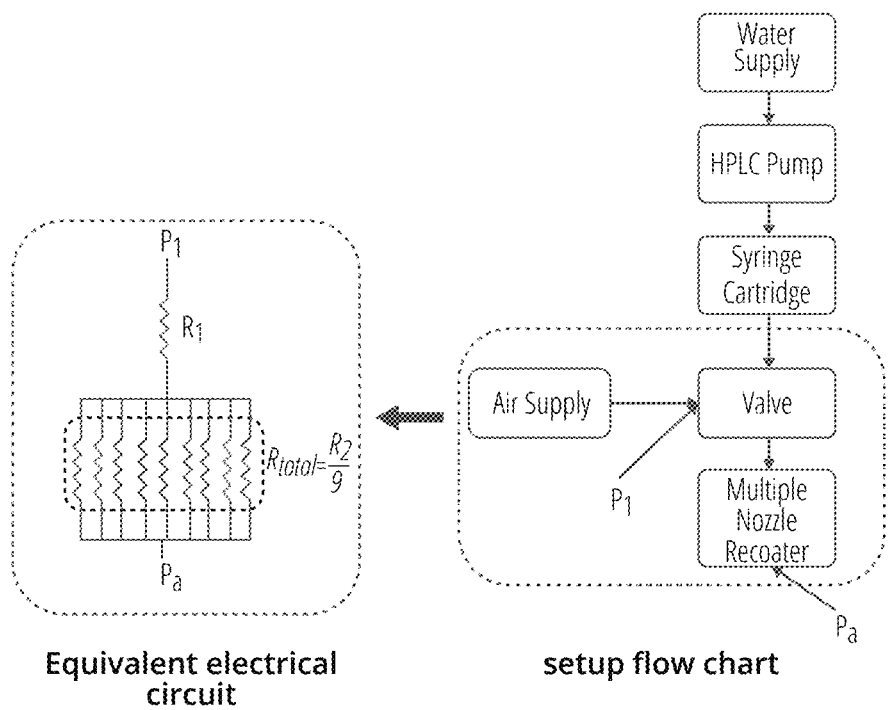

FIG. 15 shows an a schematic diagram of an exemplary setup. The setup can be configured such that when discharging of the stream of medium through the nozzles has stopped, air is injected into the nozzle head to prevent wetting of the nozzle head.

Discharge of the medium can be stopped in an advantageous way by guiding air through the nozzles at an end of a discharge period. This can be carried out in various ways. For example, a three way valve can be used for injecting pressurized air into the recoater pushing the resin out of it a high flow rate in order to prevent eventual dripping and wetting of the entire recoater surface. In FIG. 15, $P_1$ is the pressure at air supply inlet of the valve, $P_a$ is the ambient pressure, $R_1$ is the hydraulic resistance from valve to the nozzles, and $R_2$ is the hydraulic resistance at the nozzles.

Figure 16:
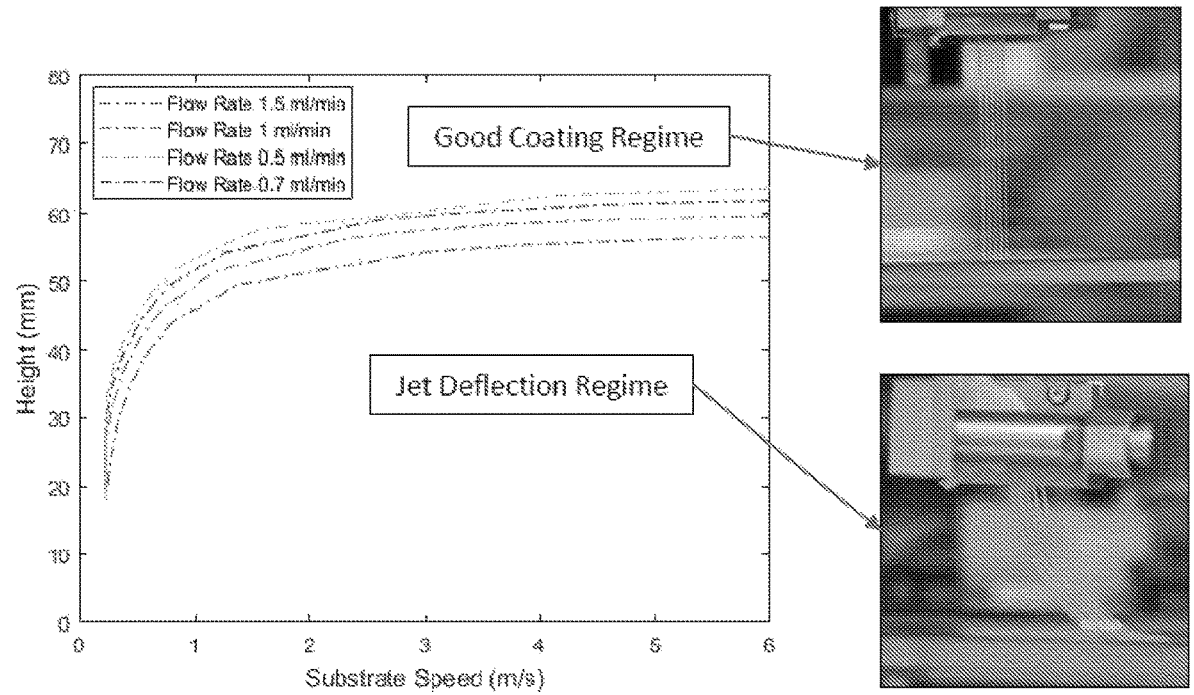
FIG. 16 illustrates different operating regimes.

FIG. 16 illustrates different operating regimes. In order to deposit a continuous sheet of resin, it is desired to prevent a jet from bending. As a result of said bending, the continuous stream of resin being discharged can break down, making it discontinuous. At least the jet height, flow rate, and substrate speed influence jet bending, see graph depicted in FIG. 16. For exemplary embodiments, bending of the jet may be prevented for a wide range of substrate speeds, if the height and flow rate are sufficiently large (e.g. 1.5 ml/min per jet, and a height of 60 mm).

FIGS. 17a and 17b show two exemplary nozzle arrangements. In order to obtain a continuous sheet at a high substrate speed (e.g. >0.5 m/s), the recoater may be configured such that the deposited lines overlap sufficiently. Since the jet tend to contract when falling, due to surface tension, the width of the deposited line can be smaller than the nozzle diameter. For example, with a nozzle of 360 µm, flow rate of 1.5 ml/min and a height of 60 mm, the width of the deposited line may be approximately 200 µm (see e.g. experimental results shown in FIG. 19). For a robust sheet deposition, the deposited lines may for example have an overlap of approximately 100 µm. However, other values are also possible for having immediate coalescence between the viscous menisci. For example, a proposed overlap may preferably be in a range between 80-120 µm.

In an example with an overlap of 100 µm, the required inclination angle to satisfy the overlap and nozzle center to center distance requirement is 2.30 and finally 25 nozzles are required per column in order to form continuous sheet along the width direction of the substrate.

Figure 17:
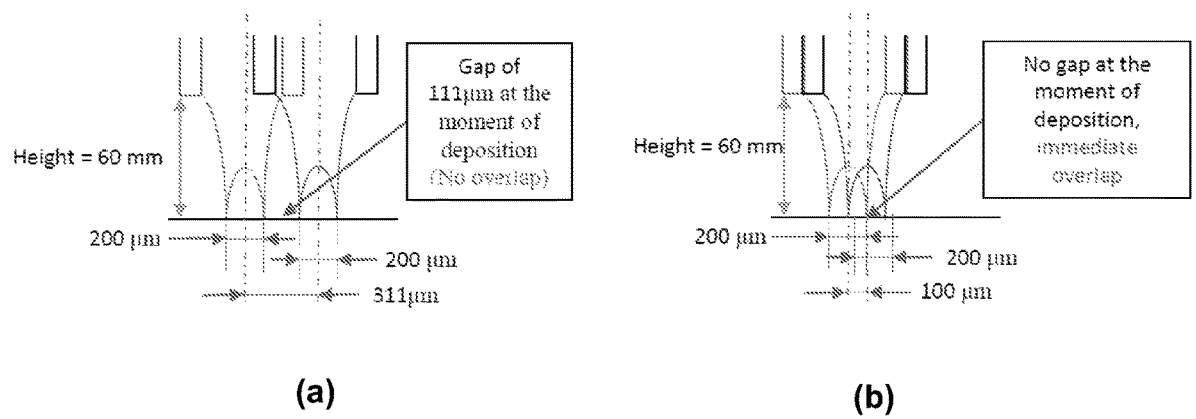
FIG. 17 shows different nozzle arrangements.

In FIG. 17 (a), the overlap is 311 µm. A gap of 111 µm is provided at the moment of the deposition (cf. no overlap). In FIG. 17 (b), the overlap is 100 µm. No gap is provided at the moment of deposition (cf. immediate overlap).

Figure 18:
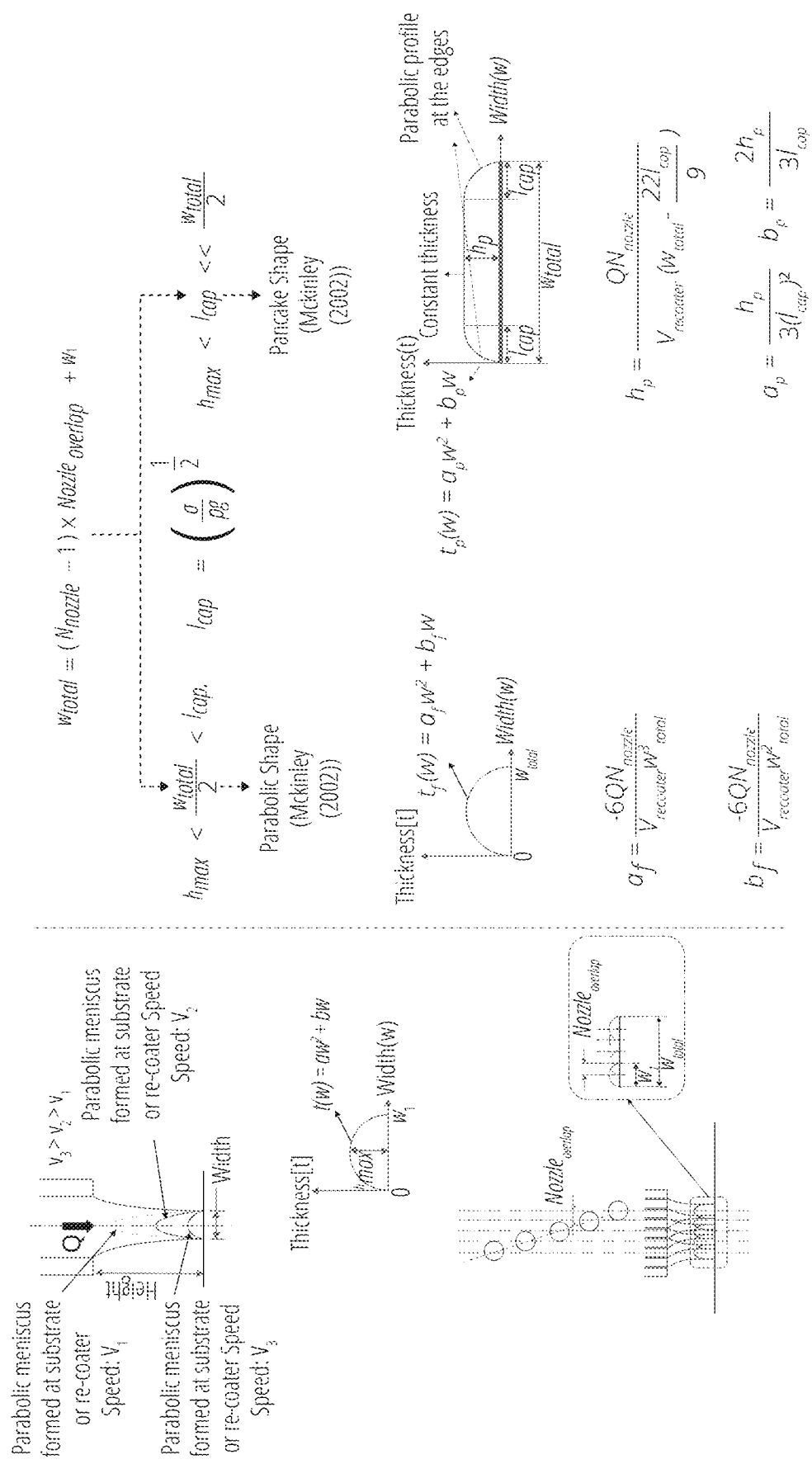
FIG. 18 shows a model for predicting the jet.

FIG. 18 shows a model for predicting the shape/diameter of the jet at downstream locations. This model allows calculation of the shape of the jet being discharged from the nozzle. Hence, the model can be employed for designing and/or configuring the recoater.

Figure 19A:
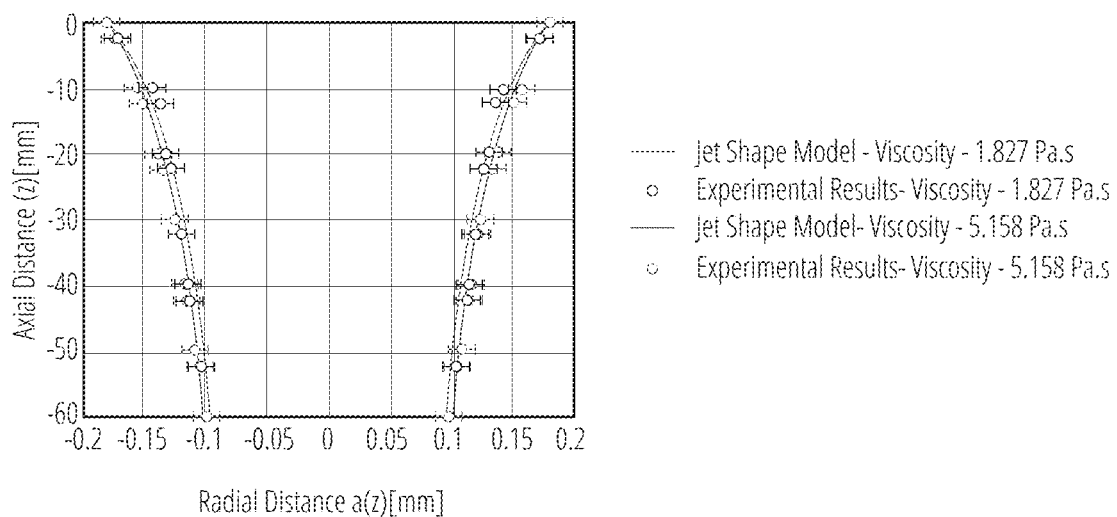
FIG. 19 illustrates different jet shapes.
Figure 19B:
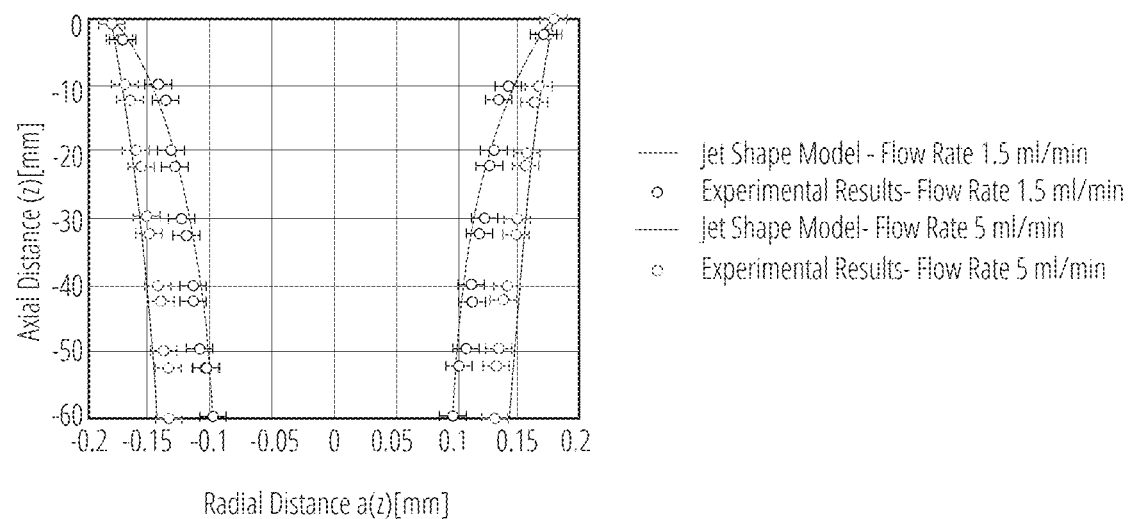

FIG. 19 illustrates different jet shapes. FIG. 19 (a) illustrates the effect of viscosity on the jet shape, with a fixed flow rate of 1.5 ml/min. FIG. 19 (b) show the effect of flow rate on the jet shape, with a fixed viscosity of 1.827 Pa·s. In both plots of FIG. 19, the axial distance (z) is plotted against the radial distance a(z). A satisfactory agreement is obtained from the model and the experimental results. The flow rate has a more dominant effect on jet diameter than viscosity. Hence, the model which is being validated can be used for approximating the jet diameter at downstream locations. The illustrated results show that the jet contracts radially when moving downwards due to gravity forces.

Figure 20:
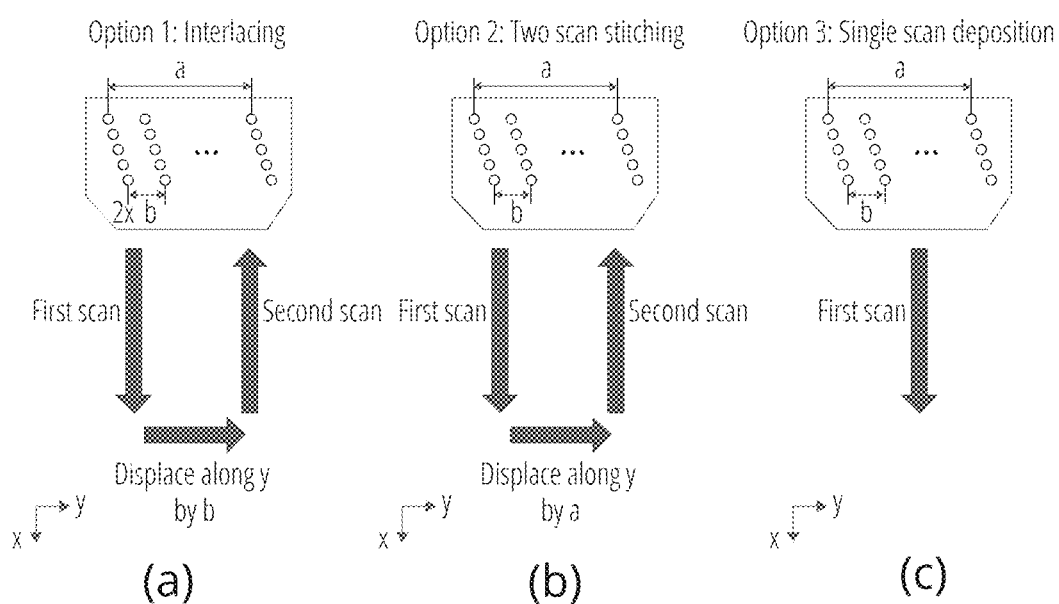
FIG. 20 illustrates a scan strategy to obtain a continuous sheet formation.

FIG. 20 illustrates a scan strategy for obtaining a continuous sheet formation using different exemplary methods. In FIG. 20 (*a*), interlacing is employed including a first scan and a second scan, wherein between the first scan and the second scan the recoater is displaced by a distance b in the y-direction. In FIG. 20 (*b*), a two-scan stitching is employed including a first scan and a second scan, wherein between the first scan and the second scan the recoater is displaced along the y-direction by a distance of a. In FIG. 20 (*c*), a single scan deposition is shown including a single scan for forming a continuous successive sheet of medium material.

A thickness profile of the deposited continuous sheet can be dependent on the recoater speed.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +1-0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

It will be appreciated that the method may include computer implemented steps. All above mentioned steps can be computer implemented steps. Embodiments may comprise computer apparatus, wherein processes performed in computer apparatus. The invention also extends to computer programs, particularly computer programs on or in a carrier, adapted for putting the invention into practice. The program may be in the form of source or object code or in any other form suitable for use in the implementation of the processes according to the invention. The carrier may be any entity or device capable of carrying the program. For example, the carrier may comprise a storage medium, such as a ROM, for example a semiconductor ROM or hard disk. Further, the carrier may be a transmissible carrier such as an electrical or optical signal which may be conveyed via electrical or optical cable or by radio or other means, e.g. via the internet or cloud.

Some embodiments may be implemented, for example, using a machine or tangible computer-readable medium or article which may store an instruction or a set of instructions that, if executed by a machine, may cause the machine to perform a method and/or operations in accordance with the embodiments.

Various embodiments may be implemented using hardware elements, software elements, or a combination of both. Examples of hardware elements may include processors, microprocessors, circuits, application specific integrated circuits (ASIC), programmable logic devices (PLD), digital signal processors (DSP), field programmable gate array (FPGA), logic gates, registers, semiconductor device, microchips, chip sets, et cetera. Examples of software may include software components, programs, applications, computer programs, application programs, system programs, machine programs, operating system software, mobile apps, middleware, firmware, software modules, routines, subroutines, functions, computer implemented methods, procedures, software interfaces, application program interfaces (API), methods, instruction sets, computing code, computer code, et cetera.

Herein, the invention is described with reference to specific examples of embodiments of the invention. It will, however, be evident that various modifications, variations, alternatives and changes may be made therein, without departing from the essence of the invention. For the purpose of clarity and a concise description features are described herein as part of the same or separate embodiments, however, alternative embodiments having combinations of all or some of the features described in these separate embodiments are also envisaged and understood to fall within the framework of the invention as outlined by the claims. The specifications, figures and examples are, accordingly, to be regarded in an illustrative sense rather than in a restrictive sense. The invention is intended to embrace all alternatives, modifications and variations which fall within the spirit and scope of the appended claims. Further, many of the elements that are described are functional entities that may be implemented as discrete or distributed components or in conjunction with other components, in any suitable combination and location.

In the claims, any reference signs placed between parentheses shall not be construed as limiting the claim. The word 'comprising' does not exclude the presence of other features or steps than those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to an advantage.

The invention claimed is:

1. A method for layerwise forming an object from a medium capable of solidification, whereby the object is built up layer per layer by:
   repeatedly, evenly, and uniformly providing a recoating layer of the medium on a support and/or an already formed part of the object and by subsequently selectively solidifying one or more selected areas of the recoating layer of the medium according to a specific pattern before a successive recoating layer is formed in a same manner;
   wherein the successive recoating layer of the medium is applied using a recoater comprising a nozzle head which further comprises a plurality of nozzles spaced apart from each other,
   wherein each nozzle has an opening area through which, during application of the successive recoating layer, a continuous stream of the medium is discharged downwards, in a stable jet lacking droplet breakup, for impinging a coverage area on the recoating layer of the medium on the support and/or the already formed part of the object,
   wherein the plurality of nozzles are arranged to provide a corresponding plurality of continuous streams,
   wherein individual ones of the plurality of continuous streams are non-intersecting,
   wherein each continuous stream, of the plurality of continuous streams, maintains coherence with an unbroken and intact outer boundary remaining without segmentation into droplets at least until contacting a surface of the recoating layer,
   wherein the nozzle head and the support are relatively movable with respect to each other in at least one running direction, and
   wherein, in one or more runs of the nozzle head in the at least one running direction, the coverage areas of the continuous streams cover an entire coverage width defined as a total span across which the continuous streams are applied in the at least one running direction.

2. The method according to claim 1, wherein the coverage areas of the continuous streams cover the entire coverage width in a single run.

3. The method according to claim 1, wherein the coverage areas of the continuous streams in the at least one running direction discharged from the plurality of the nozzles form deposition paths, wherein the deposition paths at least partially overlap.

4. The method according to claim 1, wherein the nozzle head comprises a plurality of nozzle arrays, including at least a first nozzle array and a second nozzle array,
   wherein each nozzle array, of the first nozzle array and the second nozzle array, comprises a series of nozzles configured to emit continuous streams;
   wherein nozzles of the first nozzle array positionally offset relative to nozzles of the second nozzle array such that coverage areas of the continuous streams of the nozzles in the first array at least partially overlap coverage areas of the continuous streams of the nozzles in the second array during one or more runs of the nozzle head in the at least one running direction.

5. The method according to claim 4, wherein in the at least one running direction the opening areas of the nozzles of the first array at least partially overlap with respect to the opening areas of the nozzles of the second array.

6. The method according to claim 4, wherein neighboring coverage areas in a same coverage area array are distanced at a coverage area pitch measured from a center point of the coverage area to a center point of the neighboring coverage area in the same coverage area array.

7. The method according to claim 4, wherein the coverage areas of successive arrays are offset at a coverage area array pitch in the at least one running direction,
   wherein the coverage area array pitch is measured from a first line going through center points of the coverage areas of the first array to a second line going through center points of coverage areas of the second array, and
   wherein the coverage area array pitch is larger than two times a coverage area diameter.

8. The method according to claim 1, wherein a single successive recoating layer is provided by performing a plurality of runs in the at least one running direction,
   wherein, in a first run, paths of the coverage areas of the continuous streams discharged from the plurality of nozzles in the at least one running direction are distanced from each other with non-covered regions therebetween,
   wherein the non-covered regions are subsequently covered by performing one or more additional runs,
   wherein, prior to performing the one or more additional runs, the coverage areas are shifted in a direction transverse to the running direction such that the paths of the coverage areas during the additional run cover at least a portion of the non-covered regions.

9. The method according to claim 1, wherein nozzles are arranged to selectively dispense a continuous stream of the medium,
   wherein the nozzles provide an adjustable flow rate for discharging the medium.

10. The method according to claim 1, wherein at least two subsets of the plurality of nozzles are configured to provide different materials,
    wherein a first subset is in fluid communication with a first reservoir containing a first material, and
    wherein the second subset is in fluid communication with a second reservoir containing a second material.

11. The method according to claim 1, wherein prior to applying the successive recoating layer of the medium, a height distribution of an upper surface of the recoating layer of the medium on the support and/or the already formed part of the object is determined using a measuring device, wherein applying the successive recoating layer is carried out based on the determined height distribution so as to compensate for unflatness and/or non-uniformity of the measured height distribution.

12. The method according to claim 1, wherein each nozzle is provided with an edge wall extending around an opening area.

13. The method according to claim 1, wherein a flow pulse is provided during initial commencement of discharging the continuous stream of medium.

14. The method according to claim 1, wherein a gas is guided through the nozzles at an end of a discharge.

15. The method of claim 6 wherein the coverage area pitch is between 0.5 to 1 times a coverage area diameter times a total number of arrays of the plurality of nozzle arrays.

* * * * *